(12) United States Patent
Kaji et al.

(10) Patent No.: US 7,117,141 B2
(45) Date of Patent: *Oct. 3, 2006

(54) DISK ARRAY APPARATUS SETTING METHOD, PROGRAM, INFORMATION PROCESSING APPARATUS AND DISK ARRAY APPARATUS

(75) Inventors: Tomoyuki Kaji, Yokohama (JP); Kenichi Endo, Yokohama (JP); Yuichiro Nagashima, Yokohama (JP); Fuming Liu, Yokohama (JP); Junichi Mitsuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 818 days.

This patent is subject to a terminal disclaimer.

(21) Appl. No.: 10/230,430

(22) Filed: Aug. 29, 2002

(65) Prior Publication Data

US 2003/0225934 A1 Dec. 4, 2003

(30) Foreign Application Priority Data

May 29, 2002 (JP) .............................. 2002-156178

(51) Int. Cl.
*G06F 13/10* (2006.01)
*G06F 13/12* (2006.01)

(52) U.S. Cl. ............................ 703/21; 703/24; 703/13; 703/23; 711/114; 711/152; 711/154

(58) Field of Classification Search .................. 703/21, 703/24, 23; 711/114, 170, 152; 710/8, 10
See application file for complete search history.

(56) References Cited

U.S. PATENT DOCUMENTS

| | | | | |
|---|---|---|---|---|
| 5,535,372 A * | 7/1996 | Benhase et al. | ............... | 703/23 |
| 5,822,782 A * | 10/1998 | Humlicek et al. | ........... | 711/170 |
| 6,058,454 A * | 5/2000 | Gerlach et al. | ............. | 711/114 |
| 6,098,119 A * | 8/2000 | Surugucchi et al. | ........... | 710/10 |
| 6,629,158 B1 * | 9/2003 | Brant et al. | .................... | 710/10 |
| 6,665,743 B1 * | 12/2003 | Benhase et al. | .............. | 710/10 |
| 6,684,209 B1 * | 1/2004 | Ito et al. | ......................... | 707/9 |
| 6,687,787 B1 | 2/2004 | Richardson et al. | | |
| 6,714,949 B1 | 3/2004 | Frey, Jr. | | |
| 6,754,767 B1 * | 6/2004 | Gold | .......................... | 711/114 |
| 6,779,083 B1 * | 8/2004 | Ito et al. | ..................... | 711/114 |
| 6,912,627 B1 * | 6/2005 | Matsunami et al. | ........ | 711/154 |
| 6,925,531 B1 * | 8/2005 | Konshak et al. | ............ | 711/114 |
| 6,950,871 B1 * | 9/2005 | Honma et al. | .............. | 709/226 |
| 6,954,824 B1 * | 10/2005 | Burton et al. | ................ | 711/114 |
| 2002/0156944 A1 * | 10/2002 | Benhase et al. | ................ | 710/8 |
| 2003/0014600 A1 * | 1/2003 | Ito et al. | ..................... | 711/152 |
| 2003/0033398 A1 * | 2/2003 | Carlson et al. | ............. | 709/223 |
| 2004/0088294 A1 | 5/2004 | Lerhaupt | | |

OTHER PUBLICATIONS

"The HP AutoRAID hierarchical storage system", Wilkes et al, SIGOPS '95, ACM 1995.*

* cited by examiner

*Primary Examiner*—Fred Ferris
(74) *Attorney, Agent, or Firm*—Mattingly, Stanger Malur & Brundidge, P.C.

(57) ABSTRACT

There are included the steps of receiving an operation input for defining a plurality of setting information pieces on a disk subsystem as a command by one operation, storing the defined setting information as a file, and sending the file to the disk subsystem.

9 Claims, 14 Drawing Sheets

FIG.6

| No. | COMMAND NAME | COMMAND FUNCTION | |
|---|---|---|---|
| 1 | CreateLU | LOGICAL VOLUME OF SPECIFIED SIZE IS CREATED IN SPECIFIED RAID GROUP | 601 |
| 2 | DeleteLU | SPECIFIED LOGICAL VOLUME IS DELETED | 602 |
| 3 | CreatePath | SPECIFIED PATH IS SET FOR SPECIFIED LOGICAL VOLUME | 603 |
| 4 | DeletePath | SPECIFIED PATH IS DELETED | 604 |
| 5 | CreateLUNS | LUN SECURITY FOR SPECIFIED HOST WWN IS SET FOR SPECIFIED PATH | 605 |
| 6 | DeleteLUNS | SPECIFIED LUN SECURITY IS DELETED | 606 |

FIG.7

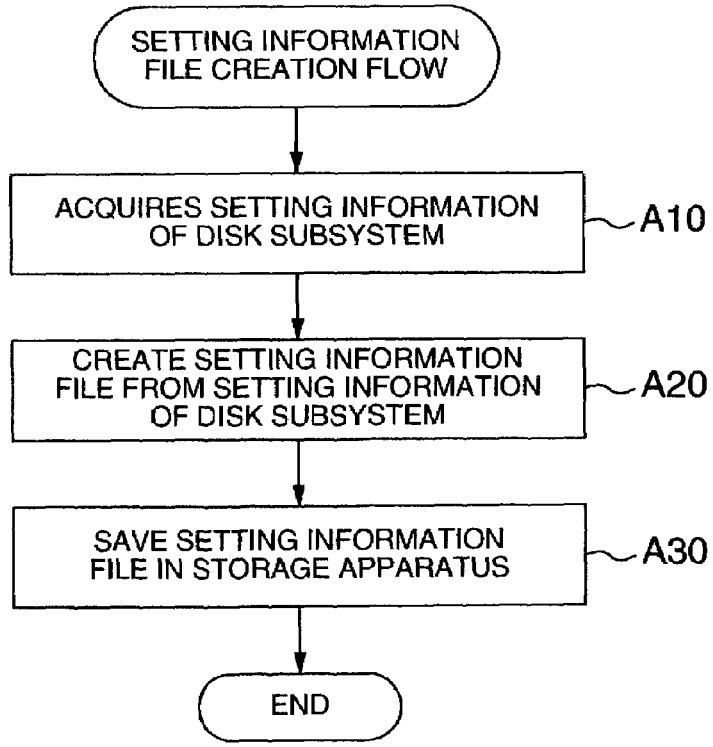

LOGICAL VOLUME TABLE

MATCHING CONDITION: CAPACITY, EMULATION TYPE
AND LOGICAL UNIT NUMBER SHOULD MATCH

DISK ARRAY APPARATUS SETTING METHOD, PROGRAM, INFORMATION PROCESSING APPARATUS AND DISK ARRAY APPARATUS

BACKGROUND OF THE INVENTION

The present invention relates to a disk subsystem setting method, a program, an information processing apparatus and a disk subsystem.

A computer system generally requires configuration information to be set as described in U.S. Pat. No. 5,995,729, for example.

When newly introducing a storage device to be used for a computer system, it is also necessary to make initial settings according to the operating environment. Examples of the settings include a logical volume setting to logically divide and use a physical disk apparatus inside the storage apparatus, a path setting and a security setting to permit access from only a specific host computer, etc. Especially in recent years, a storage apparatus adopting a configuration of disk arrays provided with many physical disks is commercialized to respond to demands for a large-volume storage apparatus with high reliability and high availability. Such a disk subsystem forms a RAID (Redundant Arrays of Inexpensive Disks) group in units of a plurality of physical disks and makes these settings in units of this RAID group.

In order to set a disk subsystem, it is necessary to send setting commands to create logical volumes and set paths, etc. one by one from a disk subsystem setting computer such as a system control host to the disk subsystem. These settings involve an enormous volume of work and are complicated as well. Wrong settings will cause abnormal access to the storage device and lead to serious trouble, and therefore the setting operation should be performed after sufficient investigation of the setting contents. To minimize the burden on this setting operation, manufacturers of disk subsystems each provide an independent setting program. Installing and executing this setting program in the disk subsystem setting computer makes it possible to perform the setting operation in an adequate GUI (Graphical User Interface) environment.

SUMMARY OF THE INVENTION

However, even in the case of a large-scale disk subsystem where the number of logical volumes amounts to several thousands, the conventional setting method needs to send commands to the respective logical volumes one by one independently to set paths, capacity and security, etc., which requires an enormous amount of work. Furthermore, at the time of making initial settings for a certain RAID group inside the disk subsystem, even if there is a RAID group of the same configuration whose initial settings have already been completed, the conventional setting method needs to send the same commands to make the settings from the beginning.

Moreover, since maintenance personnel is tied down in the setting operation until the setting operation of the entire disk subsystem is completed, extending the operation time constitutes one of factors of increased control costs. Furthermore, repeating similar setting operations many times gives rise to human errors, causing erroneous settings or setting omissions. This problem becomes more serious especially for a large-scale disk subsystem with many RAID groups.

The present invention provides a step of receiving an operation input which defines many pieces of setting information on a disk subsystem as a command by one operation, a step of storing the defined setting information as a file and a step of sending the file to the disk subsystem.

The foregoing and other problems and method of solving the problems will become more apparent from the following detailed description of preferred embodiments of the invention with reference to the drawings.

BRIEF DESCRIPTION OF THE DRAWINGS

FIG. 6 illustrates setting commands sent to the disk subsystem;

FIG. 7 is a flow chart illustrating an example of processing flow for creating a setting information file of the disk subsystem;

EMBODIMENTS OF THE INVENTION

Figure 1:
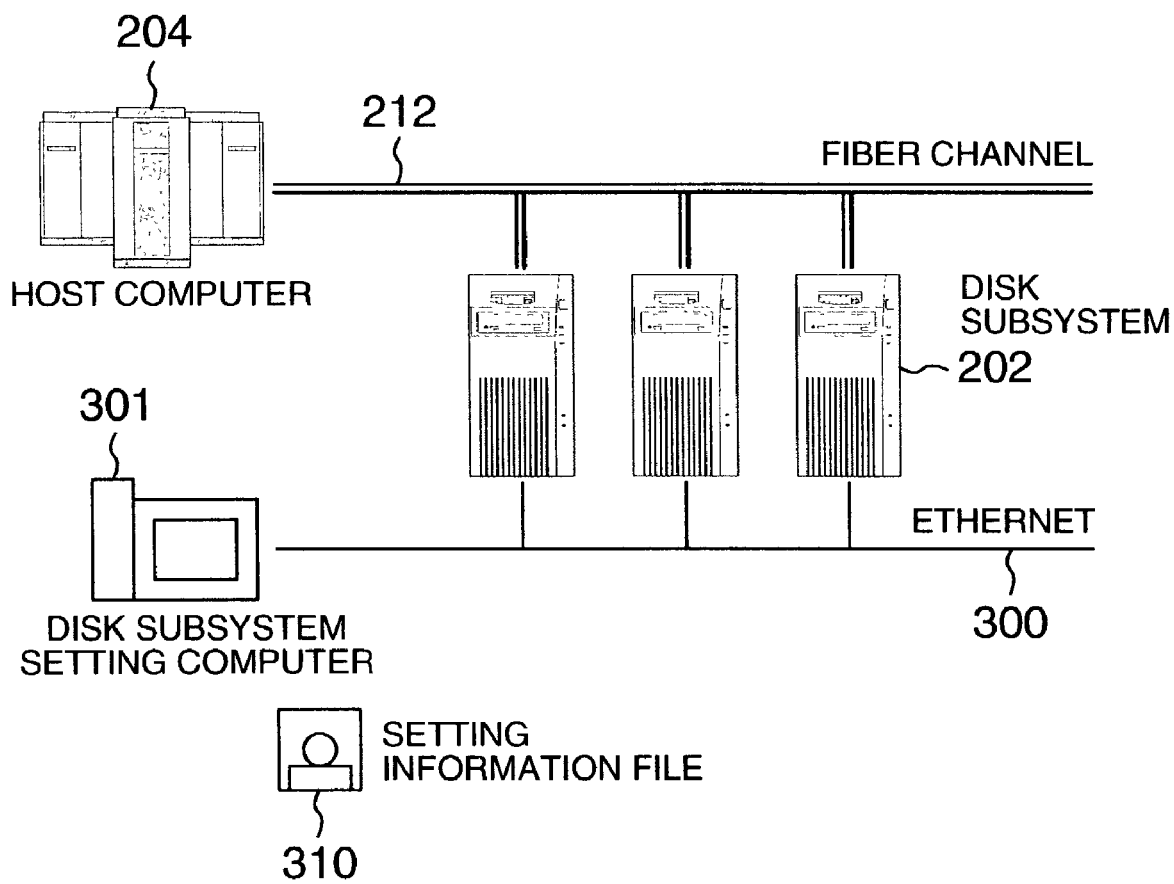
FIG. 1 illustrates an overall configuration of a computer system showing a first embodiment of the present invention.

The descriptions of the present Specification have disclosed at least the following:

an aspect of the disk subsystem setting method according to the present invention is characterized by including a step of receiving an operation input which defines many pieces of setting information on a disk subsystem as a command by one operation, a step of storing the defined setting information as a file and a step of sending the file to the disk subsystem.

Such a configuration makes it possible to set the disk subsystem based on the setting information stored as a file and thereby reduce the amount of setting operation when the same setting is applied to other disk subsystems of the same type. This simplifies the setting operation for the disk subsystem, prevents setting omissions or erroneous settings due to human errors, etc. and reduces the control cost of the disk subsystem. Furthermore, even when the disk subsystem is reset due to trouble, etc., this configuration allows the setting information stored as a file to be reused, and therefore allows quick recovery of the system.

Another aspect of the disk subsystem setting method according to the present invention is a disk subsystem setting method using an information processing apparatus connected to a disk subsystem whose setting information on at least the disk configuration is undefined, characterized by including a step of acquiring the undefined setting information from the disk subsystem, a step of changing the undefined setting information based on defined setting information, a step of creating a setting command based on the changed setting information and storing the setting command as a file and a step of sending the setting command to the disk subsystem.

By changing the setting information acquired from the disk subsystem based on the defined setting information stored in the form of a file, this configuration simplifies the setting of the disk subsystem. It also allows adjustments according to operating environments of individual disk subsystems to be made by only additional setting input operation. Thus, even in the case of settings of a large-scale disk subsystem with several thousands of logical volumes, using the setting information file serving as a basis reduces the amount of setting operation.

A further aspect of the disk subsystem setting method according to the present invention is a method of setting a first disk subsystem whose setting information on at least the disk configuration is undefined using an information processing apparatus connected to the first disk subsystem and a second disk subsystem whose setting information is defined, characterized by including a step of acquiring the undefined setting information from the first disk subsystem, a step of acquiring the defined setting information from the second disk subsystem, a step of changing the undefined setting information based on the defined setting information, a step of creating a setting command based on the changed setting information and storing the setting command as a file and a step of sending the setting command to the first disk subsystem.

By using the setting information of the disk subsystem whose setting information on at least the disk configuration is defined as the setting information of the disk subsystem whose setting information on at least the disk configuration is undefined, such a configuration simplifies the setting of the disk subsystem. It allows adjustments according to operating environments of the individual disk subsystems to be made by only additional setting input operation. Thus, even in the case of settings of a large-scale disk subsystem with several thousands of logical volumes, using the setting information file of the disk subsystem serving as a basis reduces the amount of setting operation.

A preferable aspect of the disk subsystem setting method according to the present invention further includes a step of checking adaptability of the undefined setting information to the defined setting information prior to the step of changing the undefined setting information.

Such a configuration prevents disk subsystem settings with inadaptable setting information.

A still further aspect of the present invention relates to a program to set a disk subsystem whose setting information on at least the disk configuration is undefined using an information processing apparatus connected to the disk subsystem, and the program allows the information processing apparatus to execute a step of acquiring the undefined setting information from the disk subsystem, a step of changing the undefined setting information based on the defined setting information, a step of creating a setting command based on the changed setting information and storing the setting command as a file and a step of sending the setting command to the disk subsystem.

Installing such a program in the information processing apparatus and executing the program makes it possible to change the setting information acquired from the disk subsystem based on the defined setting information stored in the form of a file and thereby simplify the setting of the disk subsystem. It also allows adjustments according to operating environments of individual disk subsystems to be made by only additional setting input operation. Thus, even in the case of settings of a large-scale disk subsystem with several thousands of logical volumes, using the setting information file serving as a basis reduces the amount of setting operation.

A still further aspect of the present invention relates to a program to set a first disk subsystem whose setting information on at least the disk configuration is undefined using an information processing apparatus connected to the first disk subsystem and a second disk subsystem whose setting information is defined, and the program allows the information processing apparatus to execute a step of acquiring the undefined setting information from the first disk subsystem, a step of acquiring the defined setting information from the second disk subsystem, a step of changing the undefined setting information based on the defined setting information, a step of creating a setting command based on the changed setting information and storing the setting command as a file and a step of sending the setting command to the first disk subsystem.

Installing such a program in the information processing apparatus and executing the program makes it possible to use the setting information of the disk subsystem whose setting information on at least the disk configuration is defined as the setting information of the disk subsystem whose setting information on at least the disk configuration is undefined, and therefore such a configuration simplifies the setting of the disk subsystem. It allows adjustments according to operating environments of the individual disk subsystems to be made by only additional setting input operation. Thus, even in the case of settings of a large-scale disk subsystem with several thousands of logical volumes, using the setting information file of the disk subsystem serving as a basis reduces the amount of setting operation.

A still further aspect of the present invention relates to a program characterized by further including a step of checking adaptability of the undefined setting information to the defined setting information prior to the step of changing the undefined setting information.

Installing such a program in the information processing apparatus and executing the program makes it possible to prevent disk subsystem settings with inadaptable setting information.

A still further aspect of the present invention is an information processing apparatus connected to and used for setting a disk subsystem whose information on at least the disk configuration is undefined, characterized by including means for acquiring the undefined setting information from the disk subsystem, means for changing the undefined setting information based on defined setting information, means for creating a setting command based on the changed setting information and storing the setting command as a file and means for sending the setting command to the disk subsystem.

Setting the disk subsystem using such an information processing apparatus makes it possible to change the setting information acquired from the disk subsystem based on the defined setting information stored in the form of a file and thereby simplify the setting of the disk subsystem. It also allows adjustments according to operating environments of individual disk subsystems to be made by only additional setting input operation. Thus, even in the case of settings of a large-scale disk subsystem with several thousands of logical volumes, using the setting information file serving as a basis reduces the amount of setting operation.

A still further aspect of the present invention is an information processing apparatus for setting a first disk subsystem whose setting information on at least the disk configuration is undefined, connected to the first disk subsystem and a second disk subsystem whose setting information is defined, characterized by including means for acquiring the undefined setting information from the first disk subsystem, means for acquiring the defined setting information from the second disk subsystem, means for changing the undefined setting information based on the defined setting information, means for creating a setting command based on the changed setting information and storing the setting command as a file and means for sending the setting command to the first disk subsystem.

Setting the disk subsystem using such an information processing apparatus makes it possible to use the setting information of the disk subsystem whose setting information on at least the disk configuration is defined as the setting information of the disk subsystem whose setting information on at least the disk configuration is undefined and thereby simplify the setting of the disk subsystem. It allows adjustments according to operating environments of the individual disk subsystems to be made by only additional setting input operation. Thus, even in the case of settings of a large-scale disk subsystem with several thousands of logical volumes, using the setting information file of the disk subsystem serving as a basis reduces the amount of setting operation.

A still further aspect of the present invention relates to an information processing apparatus, characterized in that the means for changing the undefined setting information includes means for checking adaptability of the undefined setting information to the defined setting information.

Setting the disk subsystem using such an information processing apparatus makes it possible to prevent disk subsystem settings with inadaptable setting information.

A still further aspect of the present invention relates to a disk subsystem that receives a setting command on at least the disk configuration and performs self-settings according to the command using the information processing apparatus according to the eighth to tenth aspects of the present invention.

FIG. 1 illustrates an overall configuration of a computer system according to the present invention. The computer system according to the present invention is provided with a host computer 204, disk subsystems 202, a disk subsystem setting computer 301, a setting information file 310, a fiber channel 212 and an Ethernet 300. The host computer 204 and the disk subsystems 202 are connected via the fiber channel 212, while the disk subsystems 202 and the subsystem setting computer 301 are connected via the Ethernet 300. By the way, the disk subsystem setting computer 301 is a mode of the information processing apparatus according to the claims of the present invention.

The host computer 204 is a computer equipped with a CPU (Central Processing Unit) and memory, etc. and performs predetermined functions by the CPU reading and executing an application program stored in memory. FIG. 1 shows a configuration in which one host computer is connected to a fiber channel, but it is also possible to adopt a configuration in which a plurality of computers are connected via a fiber channel. Furthermore, the network that connects the host computer 204 and the disk subsystem 202 is not limited to the fiber channel 212, but can also be an SCSI (Small Computer System Interface) or Ethernet, etc. Likewise, the network that connects the disk subsystem 202 and the disk subsystem setting computer 301 is not limited to the Ethernet 300.

The disk subsystems 202 are apparatuses to store data to be used by the host computer 204. The disk subsystems 202 have the function of receiving a setting command by the disk subsystem setting computer 301 and performing a self-setting according to the command. FIG. 1 shows a configuration in which three disk subsystems are connected via a network, but the number of apparatuses can be any number one or more.

The disk subsystem setting computer 301 is a computer having the function of setting the disk subsystems 202 and used to instruct or check the settings of the disk subsystems 202.

The setting information file 310 records the setting information of the disk subsystems 202 and is used to make settings of the disk subsystems 202 using the disk subsystem setting computer 301. The setting information file 310 employs a mode of recording data in a portable recording medium such as a floppy disk as shown in FIG. 1. It can also adopt a mode of recording data in a recording medium such as a magnetic tape or the like, a mode of recording data in a storage device incorporated in the disk subsystem setting computer 301 or a mode of recording data in other apparatuses connected to the network.

Figure 2:
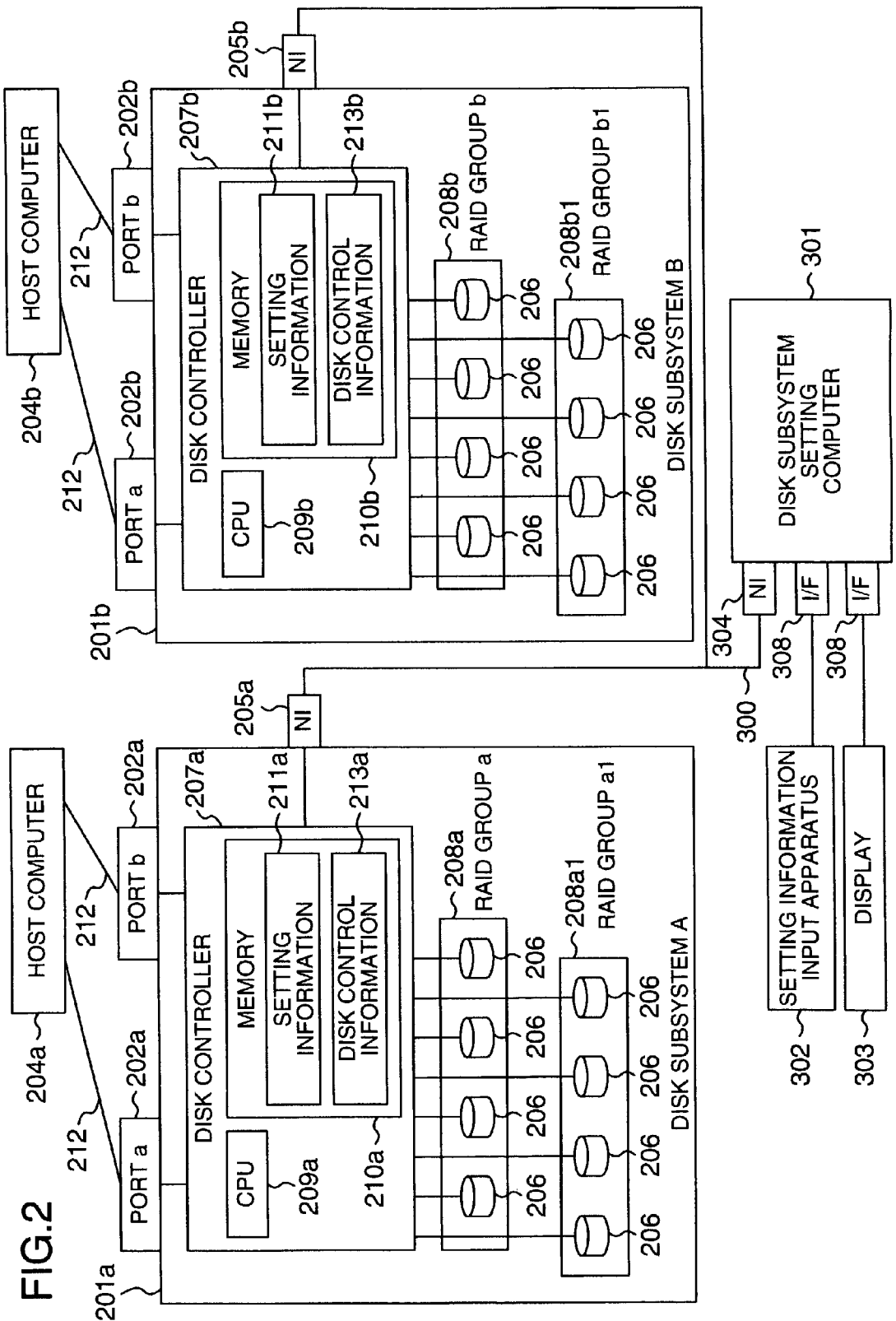
FIG. 2 is a block diagram showing an overall configuration of a computer system showing the first embodiment of the present invention.

Then, FIG. 2 shows a block diagram to illustrate the overall configuration of the computer system according to this embodiment in more detail than that in FIG. 1. Here, a case where there are two disk subsystems will be explained as an example. A disk subsystem A (201a) is a disk subsystem for which initial settings are to be made now and a disk subsystem B (201b) is a disk subsystem for which initial settings have already been completed.

The disk subsystem A (201a) and disk subsystem B (201b) are connected to the host computer 204 through a port a and port b (202) and exchange data with the host computer 204. Furthermore, the disk subsystem A (201a) and disk subsystem B (201b) are connected to the disk subsystem setting computer 301 via a network interface 205 (hereinafter abbreviated as "NI").

The disk subsystem setting computer 301 is a mode of an information processing apparatus including a general-purpose personal computer or a dedicated computer. The disk subsystem setting computer 301 includes a setting information input apparatus 302, a display apparatus 303 and an NI 304, receives a disk subsystem setting command from the maintenance personnel, communicates with the disk subsystem 201 via the NI 304 to transmit/receive information to/from the disk subsystems 201. The setting information input apparatus 302 includes a keyboard, mouse, or dedicated operation panel or remote input apparatus from the Internet, etc. The display apparatus 303 includes a liquid crystal monitor, CRT or dedicated display panel or remote output apparatus to the Internet, etc. Furthermore, the setting information input apparatus 302 and the display apparatus 303 may be an independent body which is separate from the disk subsystem setting computer 301 or may also be integral with the disk subsystem setting computer 301.

The disk subsystem A (201a) includes a plurality of physical disk apparatuses 206, a disk controller 207a, a port 202a to connect to the host computer 204a and an NI (205a) to connect to the disk subsystem setting computer 301. The plurality of physical disk apparatuses 206 are divided into one or more groups and each group constitutes a RAID. A RAID can have any level and RAID groups of different levels may also be mixed. For example, the RAID group a (208a) and RAID group a1 (208a1) in FIG. 2 may have the same RAID level or may have different RAID levels. Furthermore, the number of physical disk apparatuses 206 that constitute each RAID group 208 may be the same or may also be different.

The disk controller 207a is provided with a CPU 209a and memory 210a and performs control over the entire disk subsystem A (201a). The CPU 209a operates based on a control program and data, etc. stored in a memory 210a. The memory 210a stores a control program and data to be accessed by the CPU 209a and setting information 211a and disk control information 213a of the disk subsystem A (201a).

The setting information 211a is stored during manufacturing of the disk subsystem A (201a) and is a kind of information such as a model name, manufacturing lot number, serial number, IP address, number of ports, port display name, port number, configuration of physical disks, capacity, RAID configuration, RAID level, etc.

The disk control information 213a is RAID control information, configuration of logical volumes, path information for each logical volume, security information for access restrictions, etc.

The port a and port b (202a) are used to connect to the host computer 204a. Depending on the host computer 204a to which the port is connected, various interfaces such as a fiber channel and SCSI (Small Computer System Interface) can be selected. The number of ports is not limited to 2 and may be different from 2 depending on the model, etc. of the disk subsystem 201a. Furthermore, the number of the host computers 204a is not limited to 1, but it is also possible to adopt a configuration in which ports are connected to different host computers or adopt a configuration such as SAN (Storage Area Network) or NAS (Network Attached Storage), etc. so that ports are connected to a plurality of host computers via a network.

The NI 205a is a communication interface to communicate with the disk subsystem setting computer 301. For example, when a logical volume configuration is changed, a setting change command is sent from the disk subsystem setting computer 301 to the disk subsystem 201a via the NI 304 to change the content of the disk control information 213a stored in the memory 210a of the disk subsystem 201a. The CPU 209a controls disk access based on the recognition of a new logical volume configuration with reference to the content of the changed disk control information 213a.

The disk subsystem B (201b) is a disk subsystem for which initial settings have been completed. Like the disk subsystem A (201a), it includes a plurality of physical disk apparatuses 206, a disk controller 207b, a port 202b to connect to the host computer 204b and an NI 205b to connect to the disk subsystem setting computer 301. However, the disk subsystem B need not have the same configuration as that of the disk subsystem A. For example, it can have a different configuration with a different number of ports, different number of physical disk apparatuses and different RAID group configuration. Furthermore, the host computer 204b can also be shared with the disk subsystem A (201a) or the disk subsystem A (201a) and the disk subsystem B (201b) can also be connected to the same network (SAN, etc.).

Figure 3:
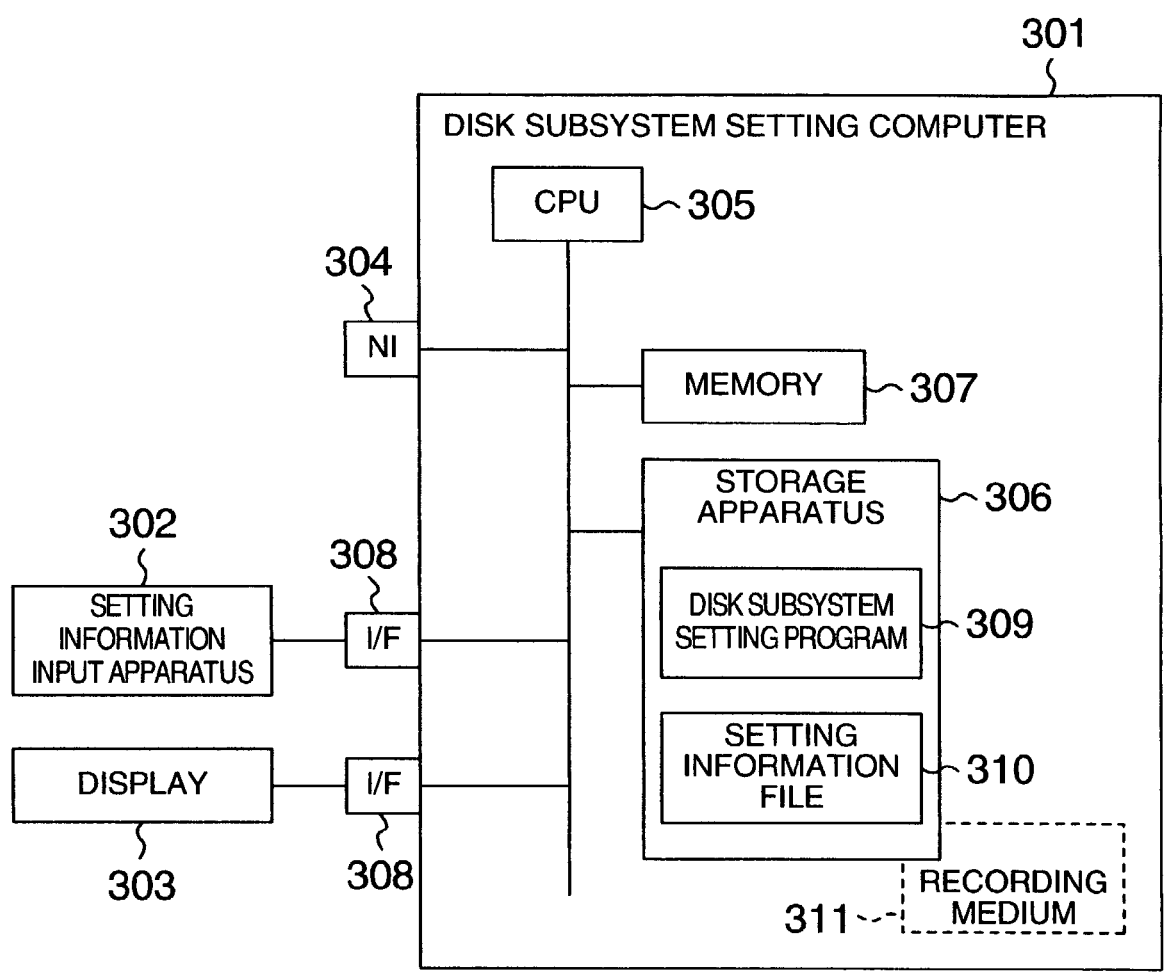
FIG. 3 is a block diagram showing a configuration of a disk subsystem setting computer showing the first embodiment of the present invention.

Then, FIG. 3 shows a block diagram showing a configuration example of the disk subsystem setting computer 301. The disk subsystem setting computer 301 is a mode of the information processing apparatus according to the present invention. The disk subsystem setting computer 301 reads and executes a disk subsystem setting program 309 according to the present invention which is recorded in various storage media. Furthermore, the setting of the disk subsystem using the method according to the present invention is made by executing the disk subsystem setting program 309 which has been read in this way.

The disk subsystem setting computer 301 is constructed of a CPU 305, a storage apparatus 306, a memory 307, an input/output interface 308 (hereinafter abbreviated as "I/F") and an NI 304.

Figure 4:
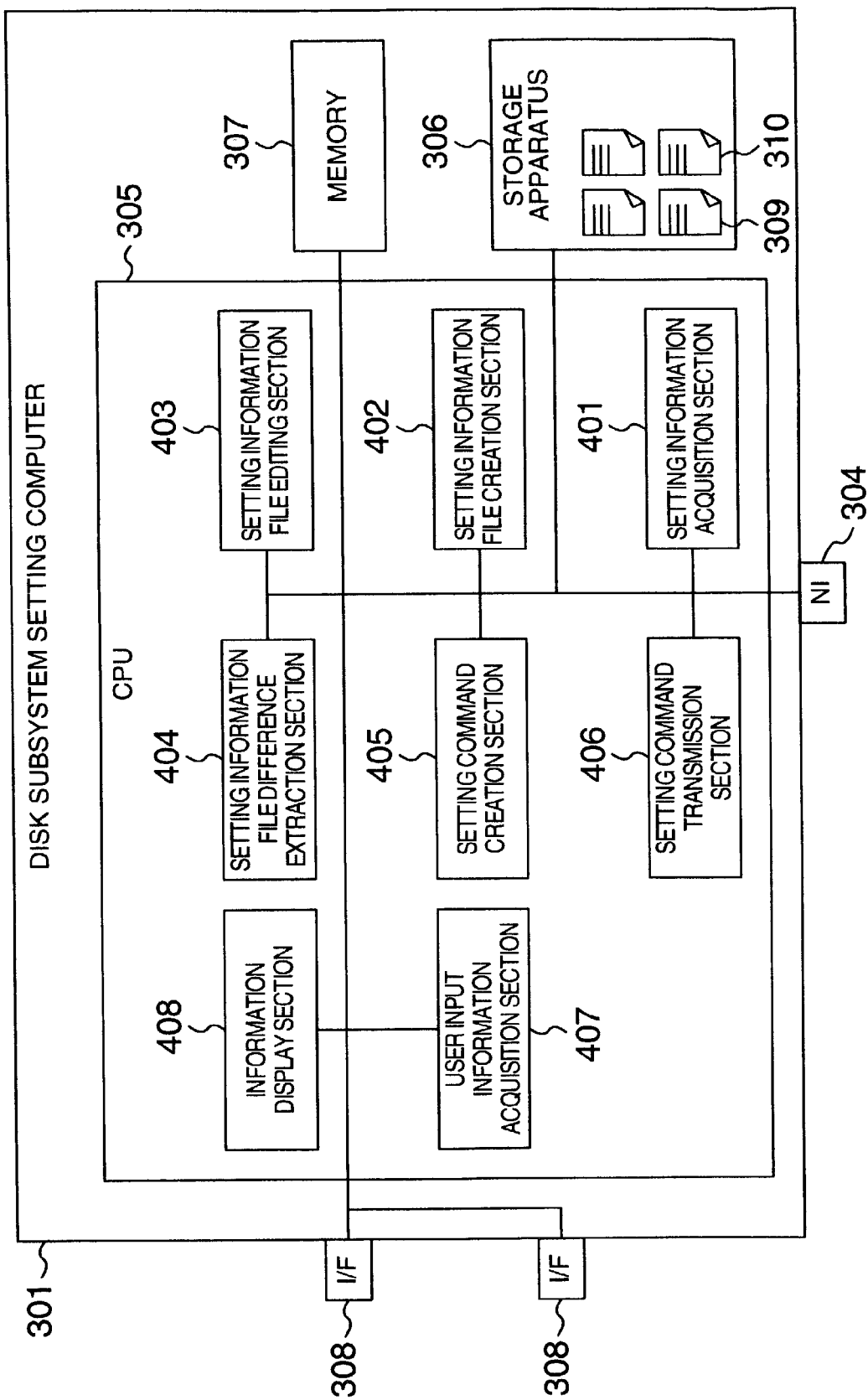
FIG. 4 illustrates an example of a block diagram of a disk subsystem setting computer.

The CPU 305 controls the entire disk subsystem setting computer 301 and operates based on a program and data, etc. stored in the memory 307. The CPU 305 also includes various processing sections shown in FIG. 4. A setting information acquisition section 401 reads the setting information 211 from the disk subsystem 201 via the NI 304. A setting information file creation section 402 creates a setting information file 310 from the setting information 211 read and saves it in the storage apparatus 306. A setting information file editing section 403 reads and edits the setting information file 310 saved in the storage apparatus 306. A setting information file difference extraction section 404 compares the two setting information files 310 and extracts differences. A setting command creation section 405 creates a setting command from the setting information files 310. A setting command transmission section 406 sends the setting command to the disk subsystem 201 via the NI 304. A user input information acquisition section 407 acquires input information from the setting information input apparatus 302. An information display section 408 displays data on the display apparatus 303.

The storage apparatus 306 stores various programs and data and stores the setting information file 310, etc. about the disk subsystem setting program 309 and disk subsystem 201 according to the present invention. The storage apparatus 306 includes a recording medium 311 which prestores programs and data and this recording medium 311 is constructed of a magnetic recording medium, optical recording medium or semiconductor memory, etc. The recording medium 311 may be fixed to the storage apparatus 306 or may be attached thereto in a detachable manner. The programs and data stored in the recording medium 311 may also be received from other devices via a communication line. Furthermore, the storage apparatus 306 may also be formed integral with or separate from the disk subsystem setting computer 301.

The memory 307 stores programs and data to be accessed by the CPU 305 and the programs and data are read from the storage apparatus 306 or setting information input apparatus 302, etc. and stored.

The I/F 308 is an interface for connecting the setting information input apparatus 302 for accepting input commands from the maintenance personnel and the display apparatus 303 to the disk subsystem setting computer 301.

The NI 304 is a communication interface to communicate with the disk subsystem 201.

Figure 5:
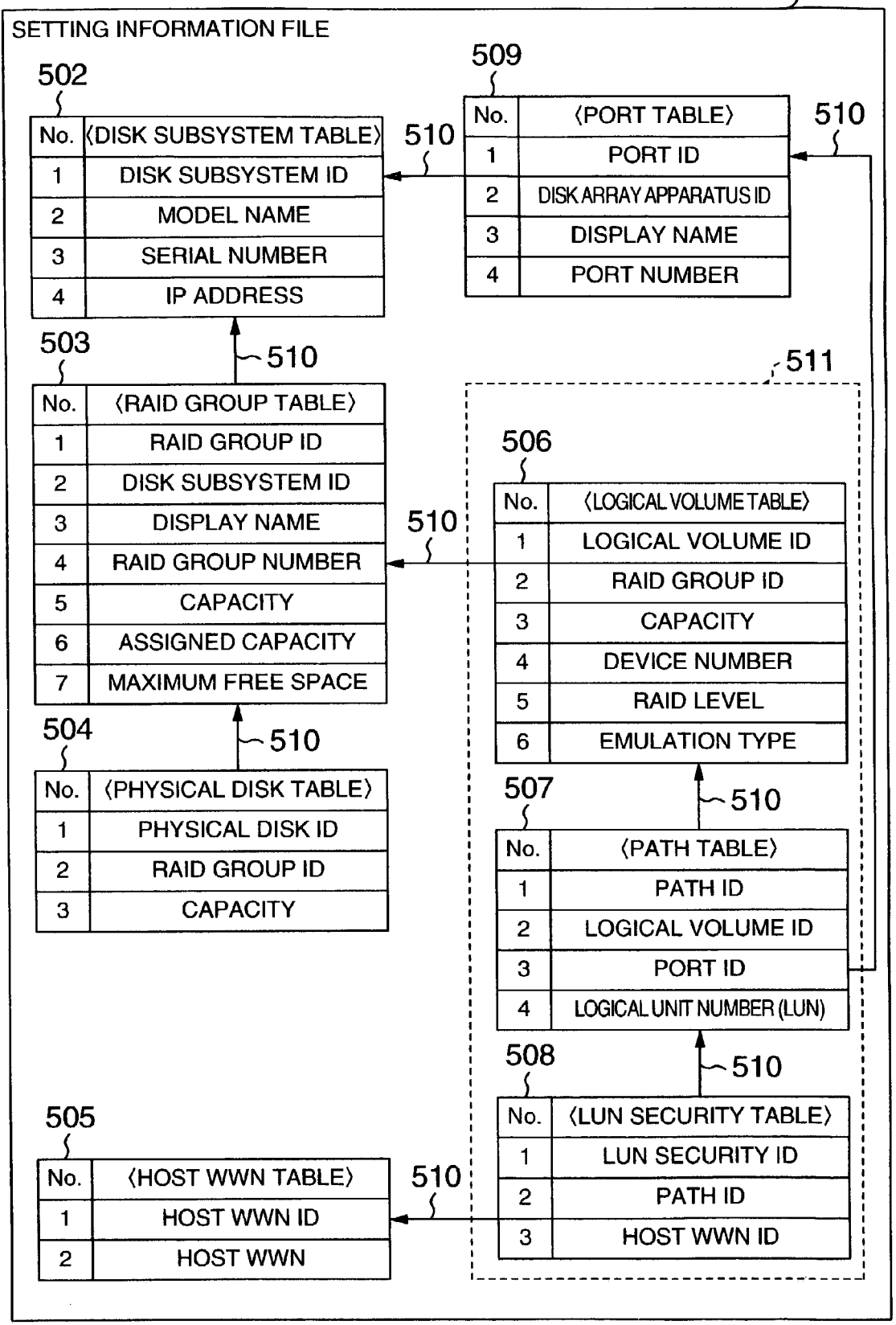
FIG. 5 illustrates an example of a setting information file of the disk subsystem.

Then, FIG. 5 shows an example of the setting information file 310. The setting information file 310 is created by the disk subsystem setting computer 301 based on the setting information 211 stored in the memory 210 of the disk subsystem 201 and changed by inputs from the maintenance personnel. As shown in FIG. 5, the setting information file 310 has a configuration in which a plurality of tables including various attributes is connected in a list structure. Arrows 510 in FIG. 5 indicate a connection relationship when the respective tables are connected in the list structure.

The tables making up the setting information file 310 are a "Disk array apparatus table" 502, "RAID group table" 503, "Physical disk table" 504, "Host WWN table" 505, "Logical volume table" 506, "Bus table" 507, "LUN security table" 508 and "Port table" 509.

The "Disk array apparatus table" 502 is a table indicating attributes of the disk subsystem 201 and includes information of "Disk array apparatus ID", "Model name" and "Serial number" and "IP (Internet Protocol) address".

The "Disk array apparatus ID" indicates an identifier of the disk subsystem table 502. The "Model name" indicates a product name of the disk subsystem 201. The "Serial number" indicates a manufacturing number. The "IP (Internet Protocol) address" indicates an Internet address of the disk subsystem 201.

The "RAID group table" 503 is a table indicating attributes of each RAID group 208 constructed in the disk subsystem 201 and includes information of "RAID group ID", "Disk array apparatus ID", "Display name", "RAID group number", "Capacity", "Assigned capacity" and "Maximum capacity of free space".

The "RAID group ID" indicates an identifier of the RAID group table 503. The "Disk array apparatus ID" indicates to which disk subsystem 201 the RAID group 208 belongs. The "Display name" indicates the name of the RAID group 208. The "RAID group number" indicates the number assigned to the RAID group 208. The "Capacity" indicates the total storage capacity of the physical disk 206 making up the RAID group 208. The "Assigned capacity" indicates a storage capacity to which a logical volume is assigned. The "Maximum capacity of free space" indicates free space.

The "Physical disk table" 504 is a table indicating attributes of various physical disks 206 making up the disk subsystem 201 and includes information of "Physical disk ID", "RAID group ID" and "Capacity".

The "Physical disk ID" indicates an identifier of the physical disk table 504. The "RAID group ID" indicates to which RAID group 208 the physical disk 206 belongs. The "Capacity" indicates a storage capacity.

The "Host WWN table" 505 is a table to show a WWN (World Wide Name) of the host computer 204 that allows access to the disk subsystem 201 and holds information of "Host WWN ID" and "Host WWN".

The "Host WWN ID" indicates an identifier of the host WWN table 505. The "Host WWN" indicates the host WWN that allows access.

The "Logical volume table" 506 is a table showing attributes of respective logical volumes created inside each RAID group 208 and holds information of "Logical volume ID", "RAID group ID", "Capacity", "Device number", "RAID level" and "Emulation type"

The "Logical volume ID" indicates an identifier of the logical volume table 506. The "RAID group ID" indicates in which RAID group 208 the logical volume is created. The "Capacity" indicates the storage capacity of the logical volume. The "Device number" indicates the device number of the logical volume. The "RAID level" indicates the level of the RAID constructed. The "Emulation type" indicates the type of emulation of the logical volume.

The "Path table" 507 is a table showing attributes of a path set for each logical volume table and holds information of "Path ID", "Port ID" and "Logical unit number (LUN)".

The "Path ID" indicates an identifier of the path table 507. The "Port ID" indicates to which port the path belongs. The "Logical unit number (LUN)" indicates to which logical volume the path belongs.

The "LUN security table" 508 is set for each path and is a table to specify the host computer 204 that allows access and holds information of "LUN security ID", "Path ID" and "Host WWN ID".

The "LUN security ID" indicates an identifier of the LUN security table 508. The "Path ID" indicates to which path the security applies. The "Host WWN ID" indicates access from which host computer 204 is allowed.

The "Port table" 509 is a table to show attributes of each port 202 of the disk subsystem 201 and holds information of "Port ID", "Disk array apparatus ID", "Port name" and "Port number".

The "Port ID" indicates a table identifier of the port table 509. The "Disk array apparatus ID" indicates to which disk subsystem 201 the port 202 belongs. The "Port name" indicates the name of the port 202. The "Port number" indicates the number of the port 202.

In FIG. 5, the area shown by a broken line 511, that is, the area involved in the logical volume table 506, path table 507, LUN security table 508 is the area set for each RAID group table 503 and is the area to be changed when settings for the disk subsystem 201 are made using the method according to the present invention. That is, according to the present invention, the contents of the upper part 511a subordinate to one RAID group table 503a out of the setting information file 310a of the disk subsystem (assumed to be the disk subsystem A (201a)) for which initial settings are made are changed based on the contents of the same part 511b subordinate to one RAID group table 503b inside the setting information file 310b of the disk subsystem (assumed to be disk subsystem B (201b)) serving as a basis, and it is thereby possible to create a logical volume of the same configuration as the RAID group 208b of the disk subsystem B (201b) serving as a basis, set the path and set the LUN security for the RAID group 208a of the disk subsystem A (201a) by one operation. Furthermore, by changing the contents of the path table 507 and LUN security table 508 for the RAID group whose logical volume has already been created, it is also possible to set only the path and LUN security.

FIG. 6 shows setting commands 600 sent from the disk subsystem setting computer 301 to the disk subsystem 201. By sending these setting commands 600 to the disk subsystem 201 and changing the contents of the disk control information 213 stored in the memory 210 of the disk subsystem 201, a logical volume is created or erased.

The setting commands 600 include "CreateLU" 601, "DeleteLU" 602, "CreatePath" 603, "DeletePath" 604, "CreateLUNS" 605 and "DeleteLUNS" 606.

Upon receipt of the "CreateLU" 601, the disk subsystem 201 according to the present invention changes the contents of the disk control information 213 so that the logical volume of the specified size is created in the specified RAID group 208. Likewise, upon receipt of the "DeleteLU" 602, the disk subsystem 201 changes the contents of the disk control information 213 so that the specified logical volume is deleted. Upon receipt of the "CreatePath" 603, the disk subsystem 201 changes the contents of the disk control information 213 so that the specified path is set for the specified logical volume. Upon receipt of the "DeletePath" 604, the disk subsystem 201 changes the contents of the disk control information 213 so that the specified path is deleted. Upon receipt of the "CreateLUNS" 605 the disk subsystem 201 changes the contents of the disk control information 213 so that LUN security for the specified host WWN is set for the specified path. Upon receipt of the "DeleteLUNS" 606 the disk subsystem 201 changes the contents of the disk control information 213 so that the specified LUN security is deleted.

According to the method of the present invention, when the setting information file 310*a* of the disk subsystem A (201*a*) for which initial settings are made is changed based on the setting information file 310*b* of the disk subsystem B (201*b*) serving as a basis, creating the setting command 600 from the difference information involved in the changed section and sending it to the disk subsystem A (201*a*) makes it possible to create a logical volume, set a path and set LUN security by one operation. The detailed procedure will be described later.

Figure 8:
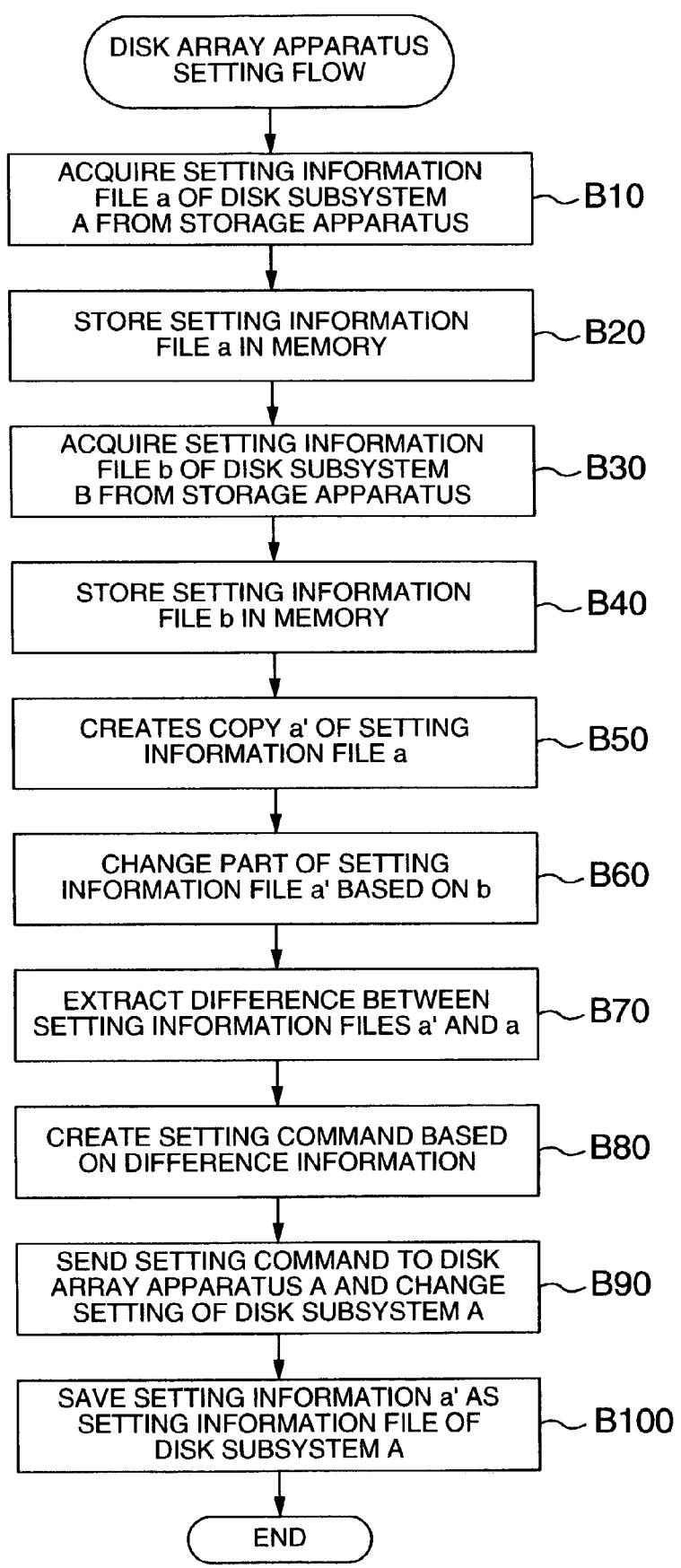
FIG. 8 is a flow chart illustrating an example of processing flow for setting the disk subsystem using a method according to the present invention.

Then, the setting procedure for the disk subsystem A (201*a*) of this embodiment will be explained with reference to the flow charts shown in FIG. 7 to FIG. 9. The setting for the disk subsystem according to the procedure described below is realized when the CPU 305 of the disk subsystem setting computer 301 executes the disk subsystem setting program 309 according to the present invention. The procedure for creating the setting information file 310*a* will be explained with reference to FIG. 7 first.

The CPU 305 of the disk subsystem setting computer 301 executes the following operations according to the disk subsystem setting program 309 read into the memory 307.

First, when the setting information input apparatus 302 receives an input from the maintenance personnel which instructs a read of the setting information 211*a* stored in the memory 210*a* of the disk subsystem A (201*a*), the disk subsystem setting computer 301 requests the disk subsystem A (201) connected via the NI 304 to send the setting information 211*a* and acquires the setting information 211*a* (step A10). The setting information 211*a* to be acquired is information of the model name, serial number, IP address, number of ports, port display name, port number, configuration of the physical disk, capacity, RAID configuration and RAID level, etc. of the disk subsystem A (201*a*). The individual setting information 211*a* obtained is stored in the memory 307 temporarily, then written into the corresponding fields of each table shown in FIG. 5, and the setting information file 310*a* is created in this way (step A20). By this time, since there is no corresponding setting information in the logical volume table 506*a*, path table 507*a* and LUN security table 508*a* inside the setting information file 310*a*, these tables are undefined. The setting information file 310*a* created in this way is assigned a file name by the maintenance personnel and then recorded in the storage apparatus 306 (step A30).

Furthermore, the storage apparatus 306 of the disk subsystem setting computer 301 stores the setting information file 310*b* about the disk subsystem B (201*b*) created in the past. For the setting information file b (310*b*), the contents of the logical volume table 506*b*, path table 507*b* and LUN security table 508*b* are already defined according to the method of the present invention or a method whereby the maintenance personnel inputs setting information pieces one by one.

Then, the procedure for making settings for the disk subsystem A (201*a*) using the setting information file 310*a* created using the above procedure will be explained with reference to the flow charts shown in FIG. 8 and FIG. 9.

First, the disk subsystem setting computer 301 reads a setting information file a (310*a*) that matches the file name specified by the maintenance personnel from the storage apparatus 306 and stores the setting information file in the memory 307 (steps B10, B20). Though not shown in the flow chart, the maintenance personnel also needs to specify a RAID group name at the time of specifying the setting information file name as will be described later. Then, the setting information file b (310*b*) that matches the file name likewise specified by the maintenance personnel is read from the storage apparatus 306 and stored in the memory 307. Here, the maintenance personnel specifies a RAID group name (steps B30, B40), too. Here, the setting information file a (310*a*) is a setting information file of the disk subsystem A (201*a*) for which initial settings are to be made now and the setting information file b (310*b*) is a setting information file of the disk subsystem B (201*b*) serving as a basis. Therefore, the setting information file b (310*b*) already defines the logical volume table 506*b*, path table 507*b* and LUN security table 508*b* for each RAID group table 503*b*, but the setting information file a (310*a*) has no definition of those tables. The order in which the setting information file a (310*a*) and setting information file b (310*b*) are read is irrelevant to the implementation of the present invention and any of the two can be read first.

Suppose the RAID group specified by the maintenance personnel when reading the setting information file a (310*a*) is RAID group a (208*a*) and the RAID group specified by the maintenance personnel when reading the setting information file b is RAID group b (208*b*). Then, the processing to be carried out now is to set the RAID group a (208*a*) so that it has the same configuration as that of the RAID group b (208*b*), that is, the same logical volume configuration, same path and same LUN security.

Then, the disk subsystem setting computer 301 creates a copy a' (310*a*') of the setting information file a (310*a*) (step B50), and then changes part of the setting information file a' (310*a*') copied above based on the setting information file b (310*b*) (step B60). This part refers to the logical volume table 506*a*, path table 507*a* and LUN security table 508*a* that belong to the RAID group table a (503*a*) to be set now.

Here, before changing the setting information file a' (310*a*'), the disk subsystem setting computer 301 checks the setting content of the RAID group b (208*b*) to see whether it can be used as the basis for the RAID group a (208*a*) or not. FIG. 9 shows a checking flow chart. By the way, the check items in the flow chart in FIG. 9 are only examples and it is also possible to use items not included here as check items. On the contrary, there is also a mode in which the check items enumerated here are not checked.

Figure 9:
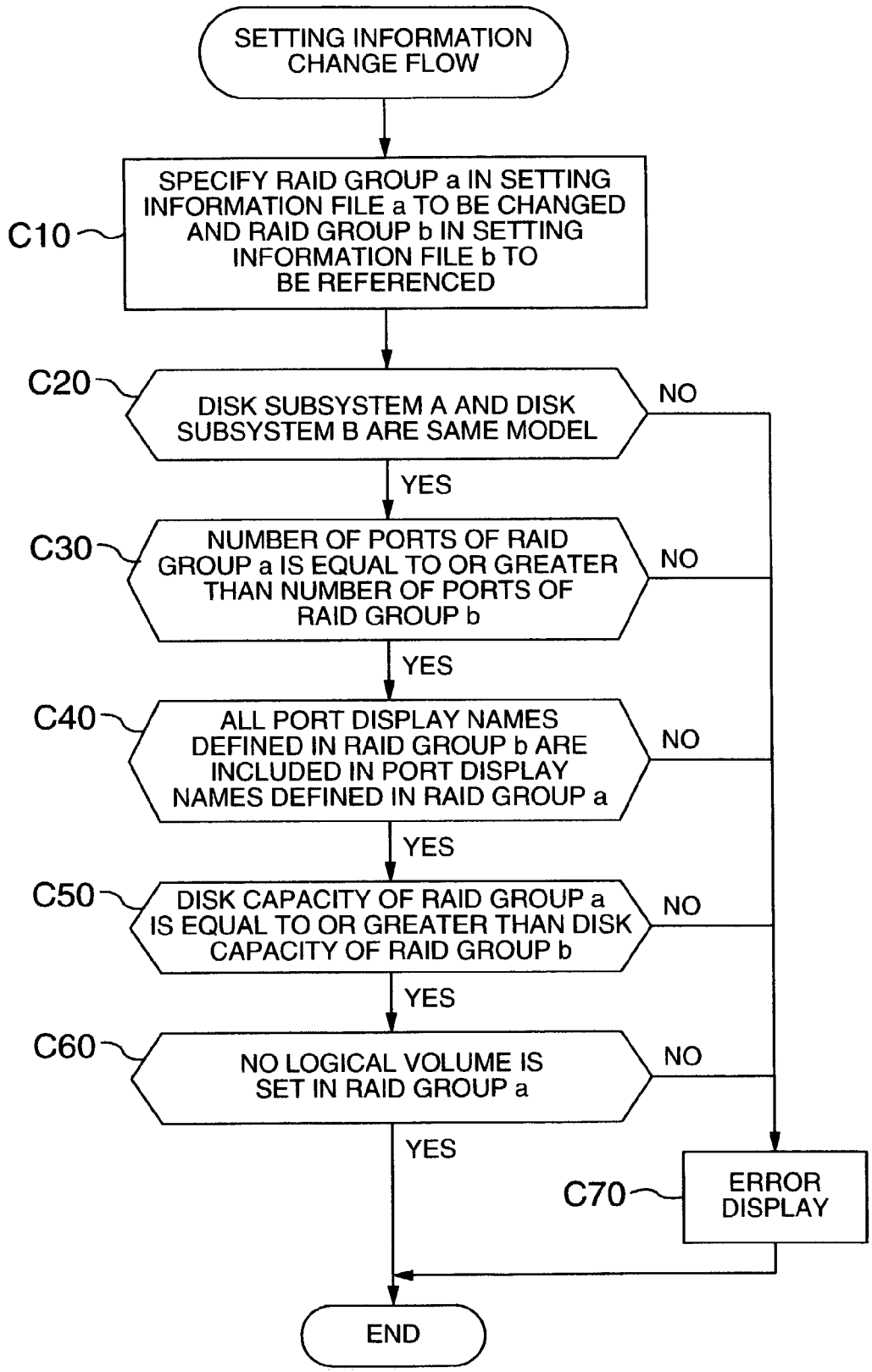
FIG. 9 is a flow chart illustrating an example of processing flow for changing the setting information file.

First, in step C10 in FIG. 9, the maintenance personnel specifies the RAID group a (208a) and RAID group b (208b) and step C10 corresponds to the procedure in aforementioned steps B10 to B40.

In step C20, it is checked whether the disk subsystem A (201a) and the disk subsystem B (201b) are the same model or not. The reason why the model identification is checked is that there is a case where the setting information file 310b of the disk subsystem B (201b) cannot be used as the basis for reasons, for example, that the number of logical volumes that can be created varies from one model to another. When the models do not match, an error results and an alarm is displayed on the display apparatus 303 (step C70). Of course, there is also a case where the setting information file can be used as the basis even if the models are different, and therefore a mode in which model identification is not used as a condition is also possible.

In step C30, it is checked whether the number of ports set in the RAID group a (208a) is equal to or greater than the number of ports set in the RAID group b (208b). This is because when the port setting of the RAID group b (208b) is applied to the RAID group a (208a), if the number of ports of the RAID group a (208a) is smaller, ports that must not exist in the RAID group a (208a) are set.

In step C40, it is checked whether the display names of all ports defined in the RAID group b (208b) are included in the display names of the ports defined in the RAID group a (208a) or not. This is because it is not possible to set the RAID group a (208a) using the port names that must not exist in the RAID group a (208a).

In step C50, it is checked whether the disk capacity of the RAID group a (208a) is equal to or greater than the disk capacity of the RAID group b (208b). This is because when the disk capacity of the RAID group a (208a) is smaller, it is not possible to set a logical volume, etc. for an insufficient disk capacity.

In step C60, it is checked whether a logical volume is set in the RAID group a (208a) or not. This is because in the case where a logical volume is already set in the RAID group a (208a), if the configuration of the logical volume of the RAID group b (208b) is reflected, the configuration of the logical volume of the original RAID group a (208a) is changed to the configuration of the logical volume of the RAID group b (208b). Of course, when the configuration needs to be changed to the configuration of the logical volume of the RAID group b (208b) or when the configuration can be changed without any problem, it is possible not to perform this check.

After the above check is completed, the disk subsystem setting computer 301 changes the setting information file a' (310a') using the following procedure (step B60).

First, the same number of logical volume tables as the logical volume tables 506b subordinate to the RAID group table b (503b) are created so that they are subordinate to the RAID group table a (503a). Each logical volume table created here is assigned a "Logical volume ID", "RAID group ID", "Device number" and "RAID level" of the RAID group a (208a) by the disk subsystem setting computer 301. Then, "Capacity" in each logical volume table 506b of the RAID group table b (503b) and the content in the "Emulation type" field are transferred to the "Capacity" and "Emulation type" fields in each logical volume table 506a subordinate to the RAID group table a (503a). In this way, definitions have been provided successfully for creating the same logical volumes for the RAID group a (208a) as for the RAID group b (208b).

Then, the disk subsystem setting computer 301 creates a path table 507a subordinate to each logical volume table 506a in the RAID group table a (503a). Each path table 507a is assigned a "Path ID" and "Logical volume ID" by the disk subsystem setting computer 301. Then, the contents of the "Port ID" and the "Logical unit number" fields in each path table 507b of the RAID group table b (503b) are transferred to the "Port ID" and the "Logical unit number" fields in each path table 503a of the RAID group table a (503a). In this way, definitions have been provided successfully for setting the same path of each logical volume in the RAID group a (208a) as the path of each logical volume in the RAID group b (208b).

Then, a LUN security table 508a subordinate to each path table 507a which has been set above is created. Each LUN security table 508a is assigned a "LUN security ID" and "Path ID" by the disk subsystem setting computer 301. Then, the content of the "Host WWN ID" field in each LUN security table 508b of the RAID group table b (503b) is transferred to the "Host WWN ID" field in each LUN security table 508a of the RAID group table a (503a). In this way, definitions have been provided successfully for setting the same LUN security of the path of each logical volume in the RAID group a (208a) as the LUN security of the path of each logical volume in the RAID group b (208b).

Thus, the setting information file a' (310a') has been changed (step B60). Then, a difference between the setting information file a' (310a') and setting information file a (310a) is extracted (step B70). The information extracted as the difference is the logical volume table 506a' path table 507a' and LUN security table 508a' created above in the RAID group table a (503a').

Then, the setting command 600 is created based on the difference information (step B80). That is, the command (CreateLU) 601 to create a logical volume defined by the logical volume table 506a' extracted as the above difference on the RAID group a (208a), the command (CreatePath) 603 to set the path defined by the path table 507a' for the above logical volume and the command (CreateLUNS) 605 to set the LUN security defined by the LUN security table 508a' for the above path are generated.

Then, these setting commands are sent to the disk subsystem A (201a). The disk subsystem A (201a) receives these setting commands and changes the settings by making self-settings according to the respective commands (step B90).

Finally, the setting information file a' (310a') is saved in the storage apparatus 306 under the file name specified by the maintenance personnel as the setting information file of the disk subsystem A (201a) (step B100).

Thus, the settings of the RAID group in the disk subsystem A (201a) have been made successfully based on the setting information file 310b of the RAID group in the disk subsystem B (201b) serving as a basis. Then, it is also possible to make adjustments according to the operating environment by sending additional setting commands to the disk subsystem A if necessary. It is also possible to make settings for the entire disk subsystem A (201a) by performing the same operation on the remaining RAID groups in the disk subsystem A (201a).

This makes it possible to perform a setting operation for a complicated and large-volume disk subsystem through a simple and small amount of operation, which would be set conventionally by the maintenance personnel by sending setting commands 600 one by one.

Then, the setting procedure for the disk subsystem in this embodiment centered on the operation by the maintenance personnel will be explained with reference to the flow charts shown in FIG. 10 to FIG. 19 and screen images displayed on the display 303 of the disk subsystem setting computer 301. The setting of the disk subsystem using the procedure explained below is realized when the CPU 305 of the disk subsystem setting computer 301 executes the disk subsystem setting program 309 according to the present invention. The screen image is an example.

Figure 10:
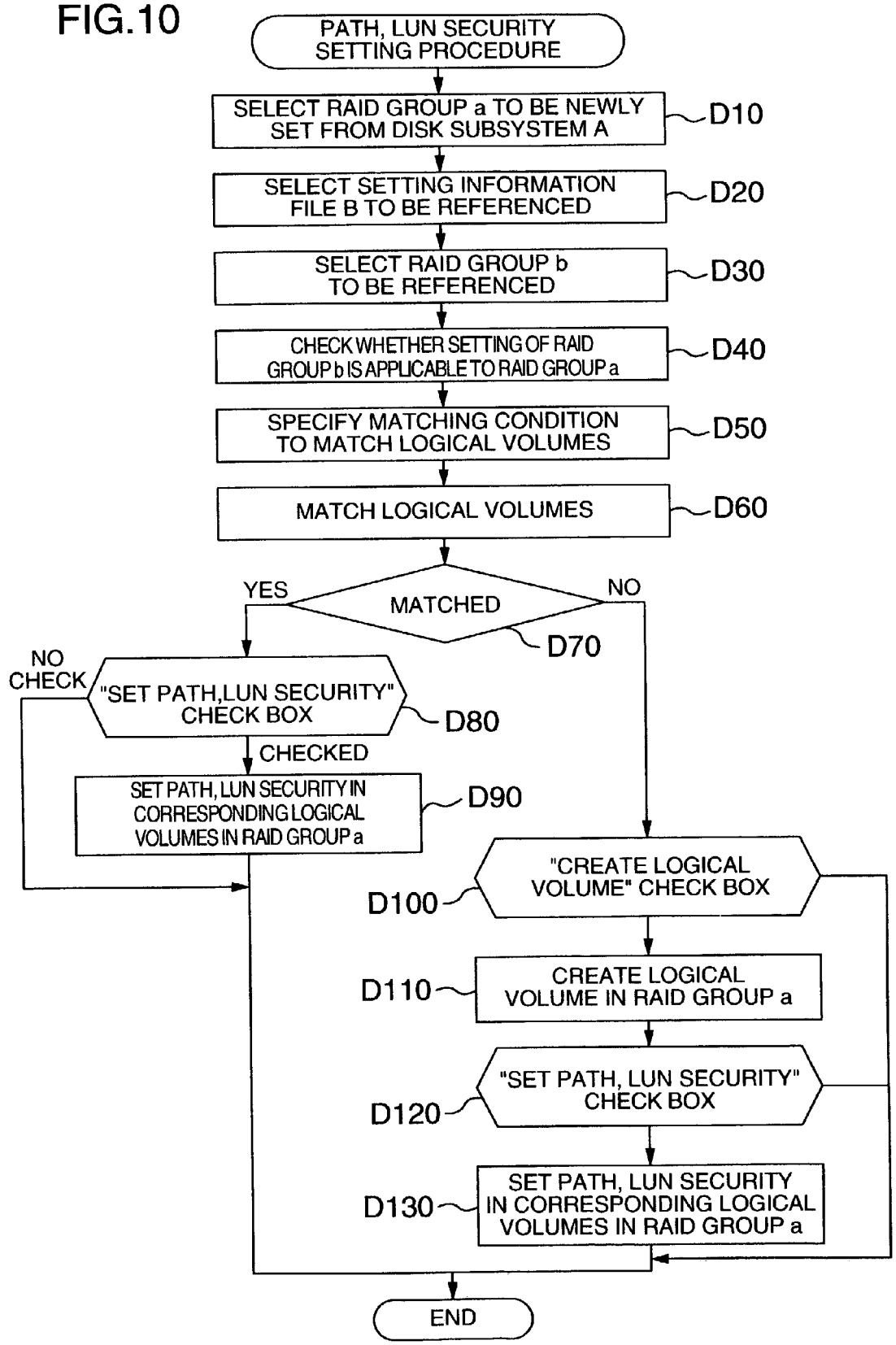
FIG. 10 is a flow chart illustrating an example of processing flow at the time of setting a path and LUN security of the disk subsystem using a method according to the present invention.

First, FIG. 10 shows a flow chart of the setting procedure for the disk subsystem 201 of this embodiment. As opposed to the flow chart shown in FIG. 8 which mainly describes the content of the processing carried out by the disk subsystem setting computer 301, FIG. 10 mainly describes the operation carried out by the maintenance personnel. The setting procedure for the disk subsystem 201 will be explained below according to the flow chart in FIG. 10 and with reference to the screen images in FIG. 11 to FIG. 19 as appropriate. The setting procedure will be explained here assuming that a path setting and LUN security setting will be made on the RAID group a (208a) in the disk subsystem A (201a) for which the logical volume has already been created based on the path setting and LUN security setting of the RAID group b (208b) in the disk subsystem B (201b).

Figure 11:
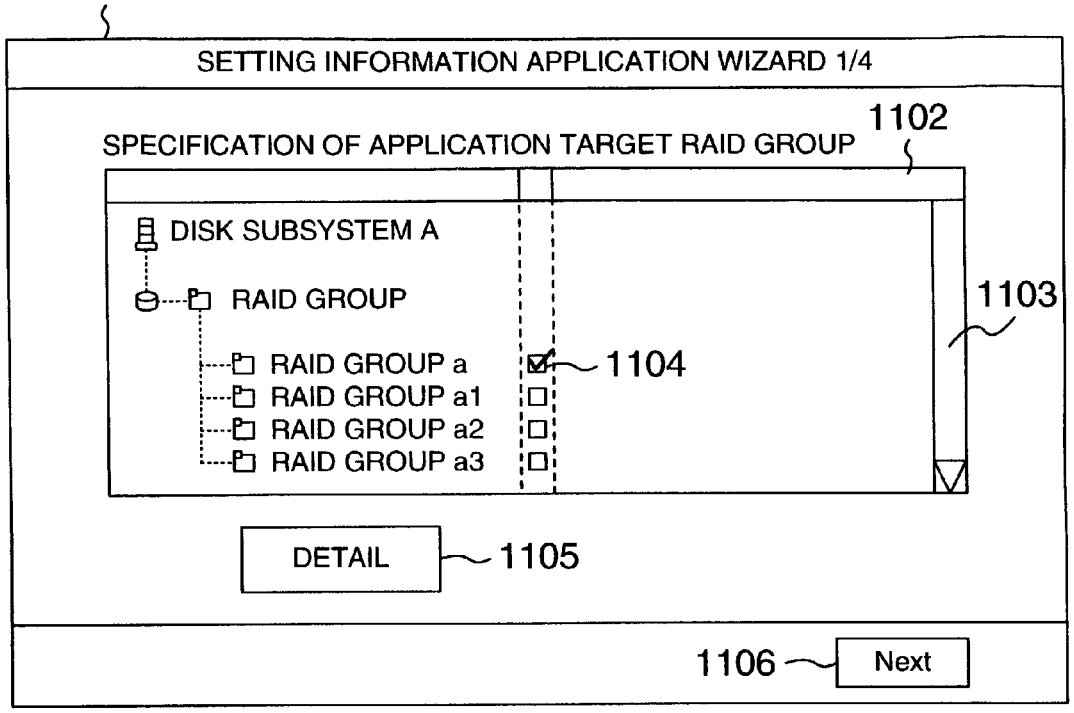
FIG. 11 illustrates an example of a screen displayed on a display apparatus of the disk subsystem setting computer at the time of specifying a RAID group to be set.
Figure 12:
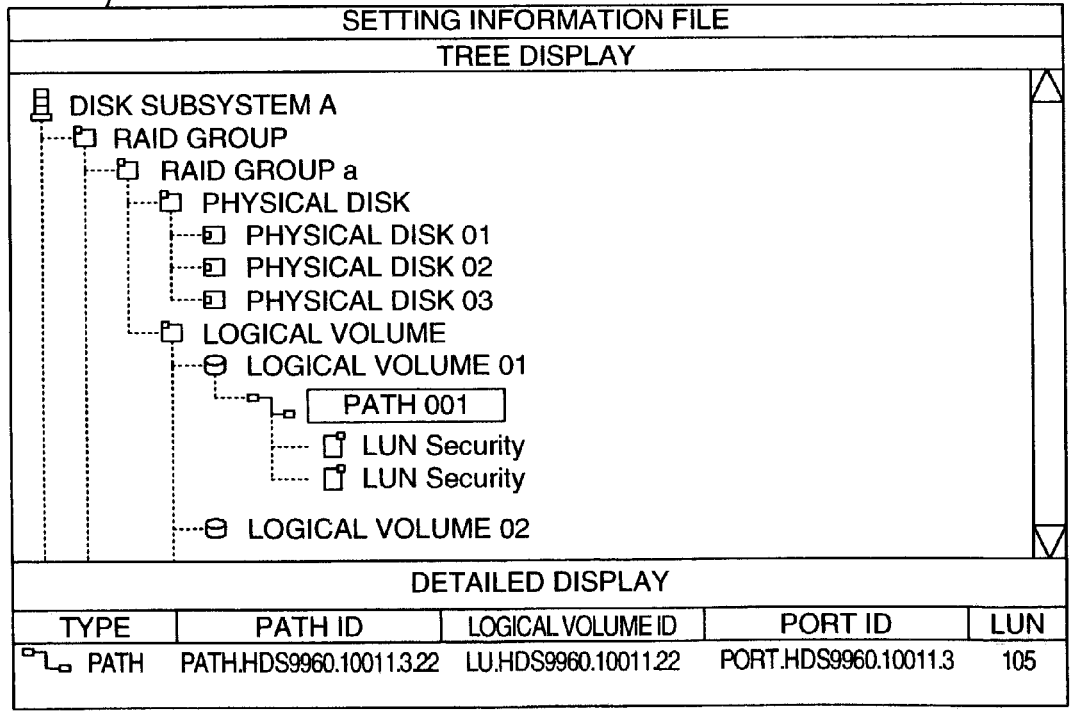
FIG. 12 illustrates an example of a screen that displays detailed information of a RAID group.

As shown in FIG. 10, the maintenance personnel selects the RAID group a (208a) from among the disk subsystem A (201a) as the group to be set now first. The selection is made on the display screen 303 (step D10). FIG. 11 shows how the selection is made. As shown in FIG. 11, the display screen 303 of the disk subsystem setting computer 301 displays a "Specification of applicable RAID group" setting information application wizard screen (1/4) 1101 to specify a RAID group to be newly set now. The maintenance personnel operates the scroll bar 1103 of the window 1102 displayed inside the this setting information application wizard screen 1101 to display the disk subsystem A and place a check mark 1104 in the target RAID group (RAID group a) using an input device such as a mouse as shown in FIG. 11. Selecting the "Detail" field 1105 shows a screen 1201 in FIG. 12, making it possible to obtain detailed information of the disk subsystem A (201a).

Figure 13:
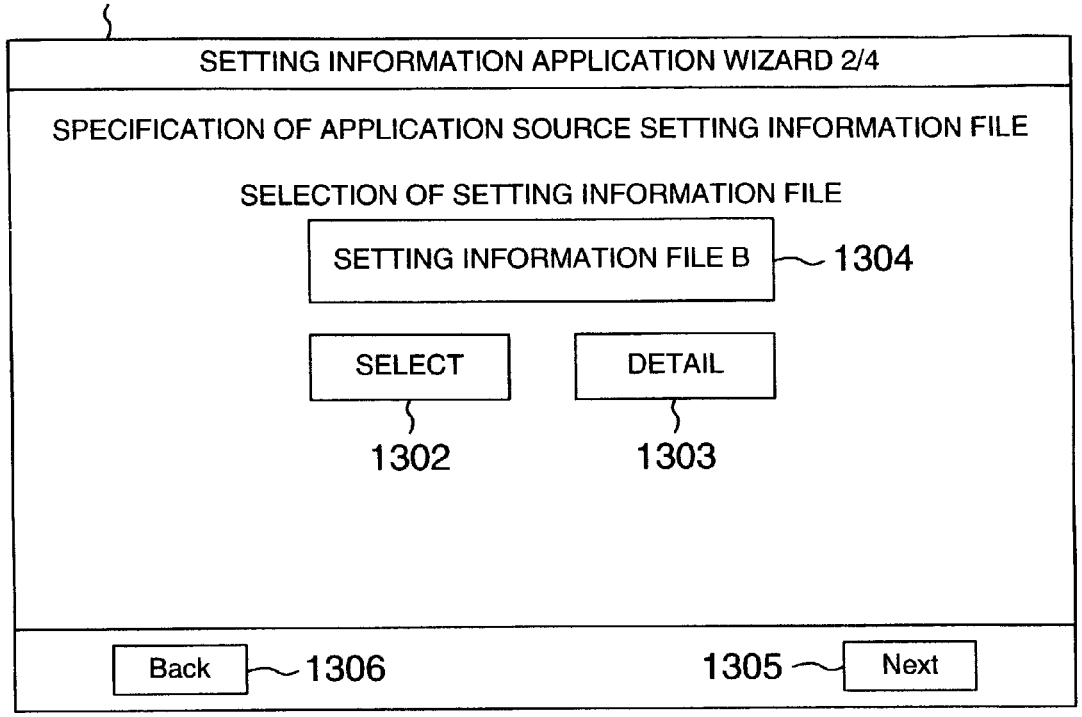
FIG. 13 illustrates an example of a screen displayed at the time of specifying a setting information file serving as a basis.
Figure 14:
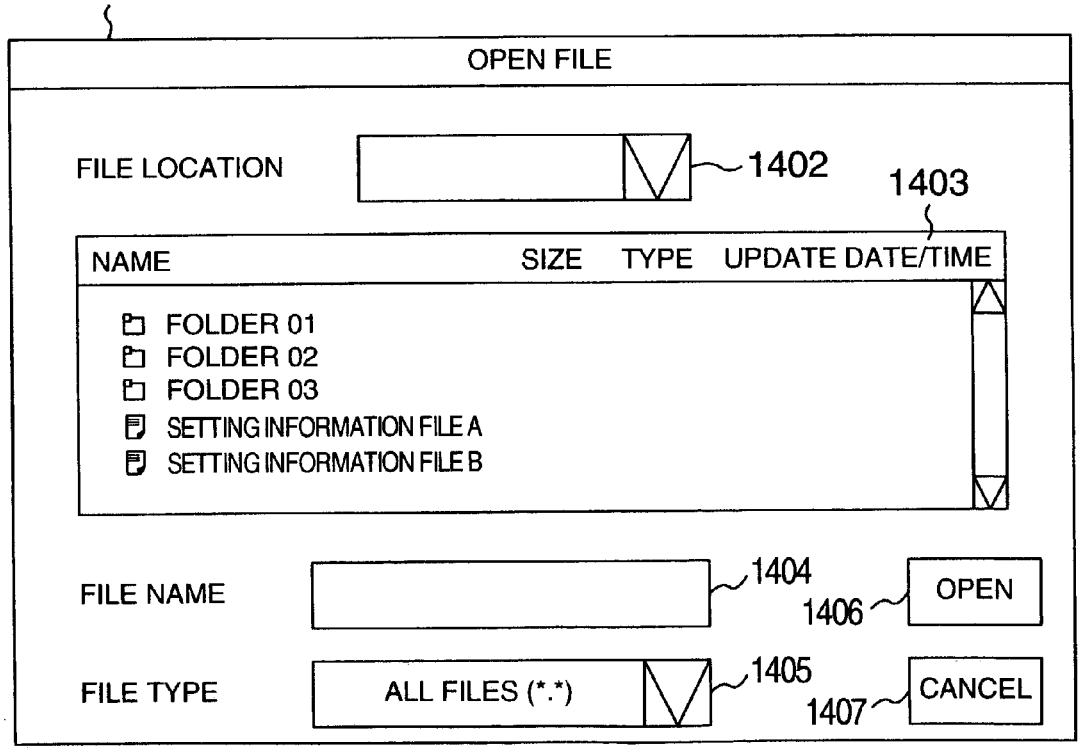
FIG. 14 illustrates an example of a setting information file selection screen.
Figure 15:
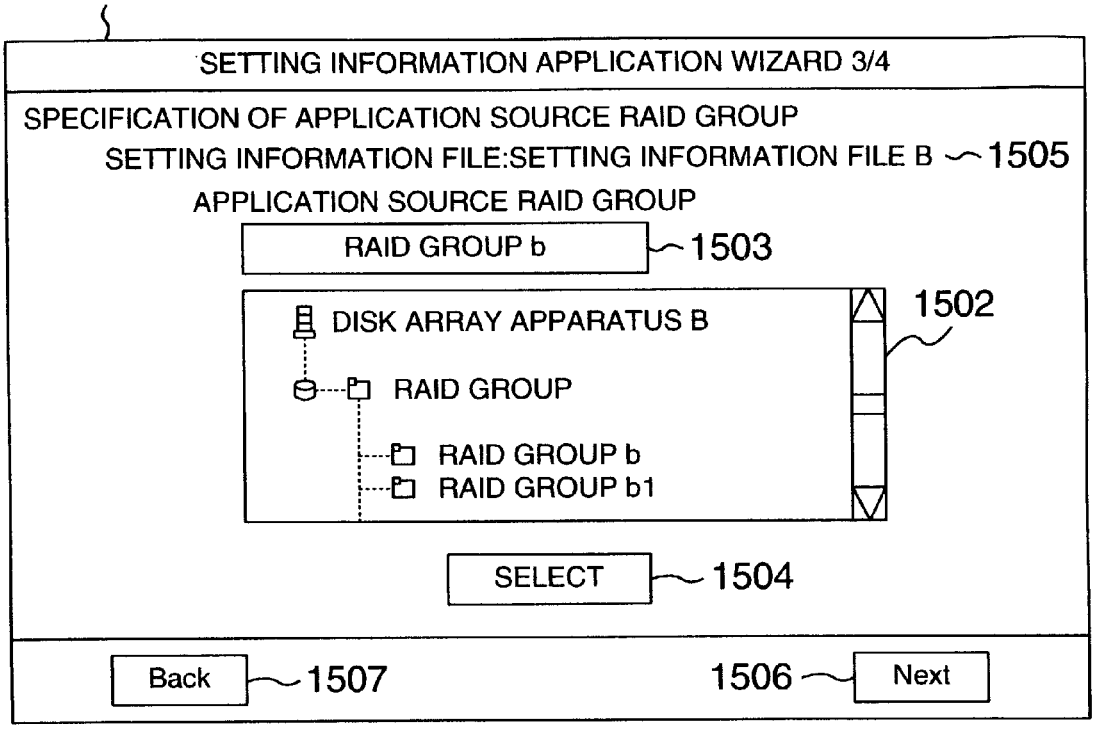
FIG. 15 illustrates an example of a screen displayed at the time of specifying a RAID group serving as a basis.

Then, the maintenance personnel selects setting information file B (310b) which is the setting information file of the disk subsystem B (201b) (step D20). As an operation on the screen, the maintenance personnel selects "Next" 1106 in FIG. 11 to switch the screen to a setting information application wizard screen (2/4) 1301 shown in FIG. 13. In FIG. 13, clicking on the "Select" field 1302 with the mouse, etc. shows an "Open file" window 1401 in FIG. 14. The "Open file" window 1401 displays a list 1403 of the selectable setting information file 310. The maintenance personnel selects the target setting information file B (310b) from the setting information file list 1403. Selecting the "Detail" field 1303 shows the screen 1201 in FIG. 12 where it is possible to obtain detailed information of the disk subsystem B (201b) defined by the setting information file B (310b).

Then, the maintenance personnel selects the RAID group b from among the setting information file B (310b) (step D30). As a screen operation, the maintenance personnel selects "Next" 1305 in FIG. 13 to switch the screen to the setting information application wizard screen (3/4) 1501 shown in FIG. 15. By operating the scroll bar of the window 1502 displayed in FIG. 15 to display the RAID group b and clicking on the characters "RAID group b" displayed with the mouse, etc., it is possible to select the RAID group b. The selection result is displayed in the "Application source RAID group" field 1503. Clicking on the "Select" field 1504 shows the "Open file" window 1401 in FIG. 14, which allows the setting information file to be changed. The currently selected setting information file is displayed in the "Setting information file" field 1505 in FIG. 15.

Then, the maintenance personnel checks whether the setting content of the RAID group b (208b) is applicable to the RAID group a (208a) or not (step D40). If the check result shows no problem, the process moves on to a step (from step D50 onward) in which the setting content of the RAID group b (208b) is applied to the RAID group a (208a). As a screen operation, the maintenance personnel selects the "Next" 1506 in FIG. 15 to switch the screen to a setting information application wizard screen (4/4) 1601 shown in FIG. 16. In the setting information application wizard screen (4/4) 1601, the maintenance personnel can check the setting information file and select setting processing. It is possible to select the setting processing by checking "Create logical volume" and "Perform path setting and LUN security" in the "Select setting processing" check box 1604. Here, the logical volume has already been set in the application target RAID group a (208a) and only a path and LUN security should be set, and therefore it is necessary not to change the logical volume configuration of the RAID group a (208a). In this case, only "Perform path setting and LUN security" should be checked without checking "Create logical volume".

Figure 17:
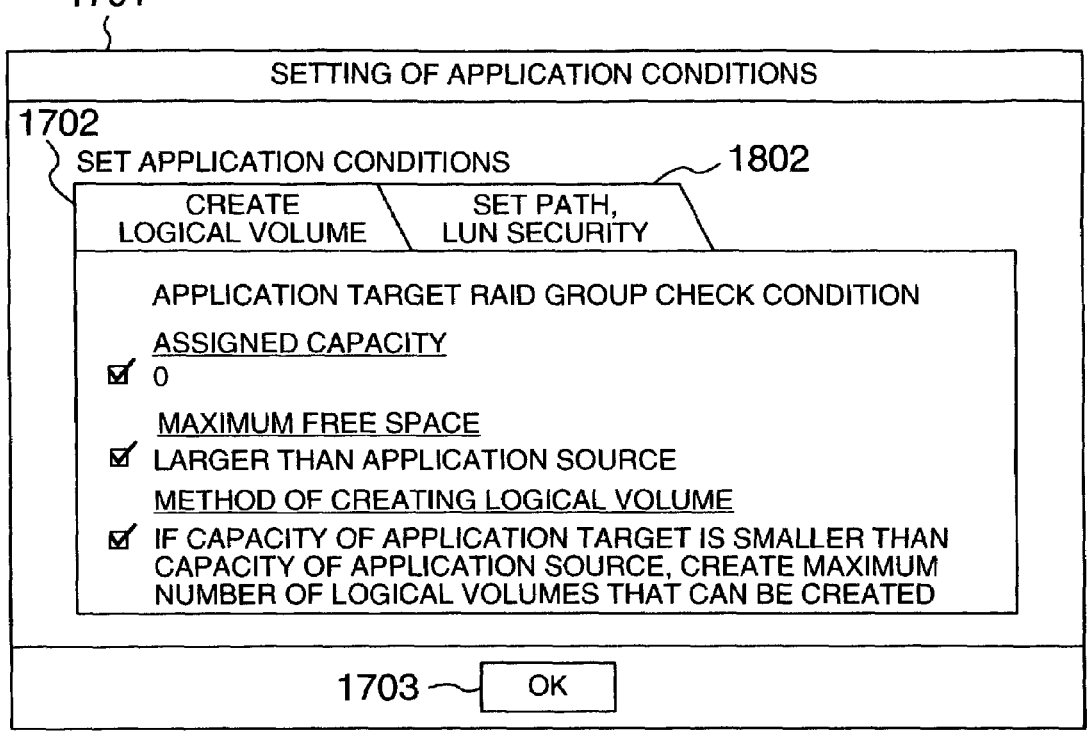
FIG. 17 illustrates an example of a screen displayed at the time of setting conditions to create a logical volume.
Figure 18:
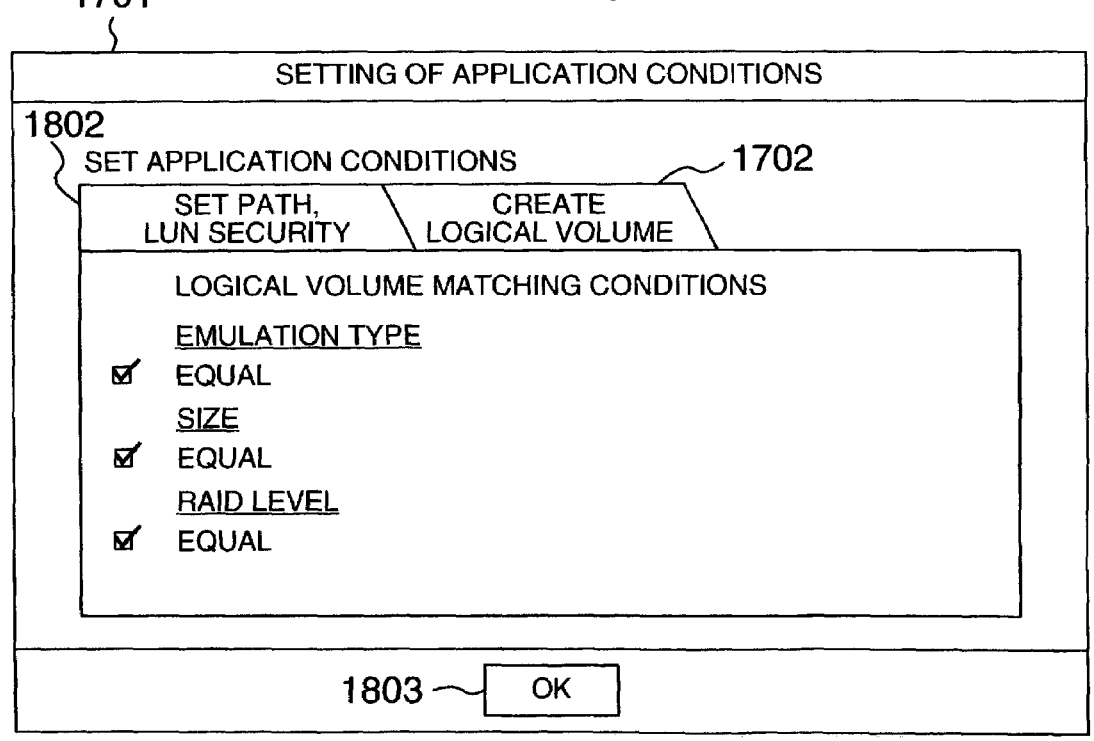
FIG. 18 illustrates an example of a screen displayed at the time of setting matching conditions of a logical volume.

When there is no problem in the result of checking the contents of the setting information application wizard screen (4/4) 1601, the maintenance personnel clicks on the "Set" field 1605. Doing so shows a "Setting of application conditions" window 1701 as shown in FIG. 17 and FIG. 18. The "Setting of application conditions" window 1701 includes a "Create logical volume" window 1702 and "Set path, LUN Security" window 1802. The "Create logical volume" window 1702 is a window to specify conditions when creating a new logical volume. The "Set path, LUN Security" window 1802 is a window to specify conditions for matching the logical volume when setting a path and LUN security. Windows can be switched by clicking on tags at the top of the window. However, these windows need not be separated into two portions and it is also possible to use a common window or adopt a 3-window configuration.

Here, this matching the logical volume means checking whether the attribute of the logical volume in the RAID group a (208a) matches the attribute of the logical volume in the RAID group b (208b) or not. Attribute examples for checking the match include an emulation type, size and RAID level, etc.

The "Create logical volume" window 1702 includes an "Assigned capacity" check box, "Maximum free space" check box and "Method of creating logical volume" check box.

In the "Assigned capacity" check box, creation of a logical volume is specified only when no logical volume is created yet in the application target RAID group. In the "Maximum free space" check box, creation of a logical volume is specified only when the storage capacity of the application target RAID group is greater than the storage capacity of the RAID group serving as a basis. In the "Method of creating logical volume" check box, creation of a maximum number of logical volumes that can be created for the application target RAID group is specified when the storage capacity of the application target RAID group is smaller than the storage capacity of the application source. Of course, the check boxes here are only examples and it is also possible to adopt a configuration with no such check boxes or adopt a configuration including check boxes other than these check boxes.

The "Set path, LUN Security" window 1802 includes an "Emulation type" check box, "Size" check box and "RAID level" check box. These check boxes are check boxes to specify conditions to match the logical volumes as described above.

In the "Emulation type" check box, settings of a path and LUN security are specified only when the logical volume of the application target RAID group is equal to the emulation type of the logical volume of the application source RAID group. In the "Size" check box, settings of a path and LUN security are specified only when the size of the logical volume of the application target RAID group is equal to the size of the logical volume of the application source RAID group. In the "RAID level" check box, settings of a path and LUN security are specified only when the level of the logical volume of the application target RAID group is equal to the level of the logical volume of the application source RAID group. Of course, the check boxes presented here are only examples and it is also possible to adopt a configuration with no such check boxes or adopt a configuration including check boxes other than these check boxes.

Figure 16:
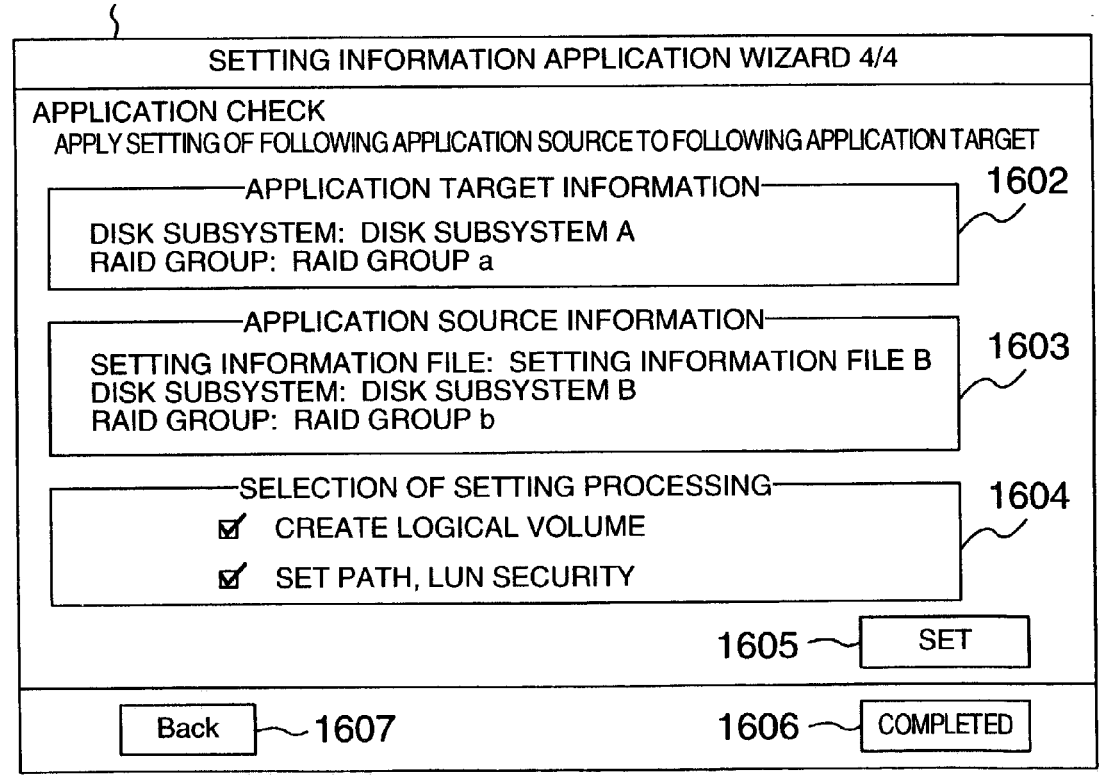
FIG. 16 illustrates an example of a screen displayed for checking a setting content.

After checking the above-described check boxes, the maintenance personnel clicks on a "Completed" 1606 in FIG. 16. Then, the disk subsystem setting computer 301 checks whether the settings of the RAID group b (208b) is applicable to the RAID group a (208a) according to the flow chart in FIG. 9 (step D40) and if applicable, the disk subsystem setting computer 301 matches the logical volumes (step D60) according to the conditions set by the maintenance personnel (step D50).

When the logical volumes are matched (step D70), the disk subsystem setting computer 301 carries out processing according to the "Set path, LUN Security" check box in FIG. 16. When the check box is ON (step D80), the contents of the path table 507b of the setting information file 310b of the RAID group b (208b) and the LUN security table 508b are transferred to the respective tables of the setting information file 310a of the RAID group a (208a) (step D90). When the "Set path, LUN Security" check box is not ON (step D80), the setting operation is finished.

On the other hand, when the logical volumes are not matched (step D70), the disk subsystem setting computer 301 carries out processing according to the "Create logical volume" check box and "Set path, LUN security" check box. Here, since the "Create logical volume" check box is OFF, the setting operation is finished.

Figure 19:
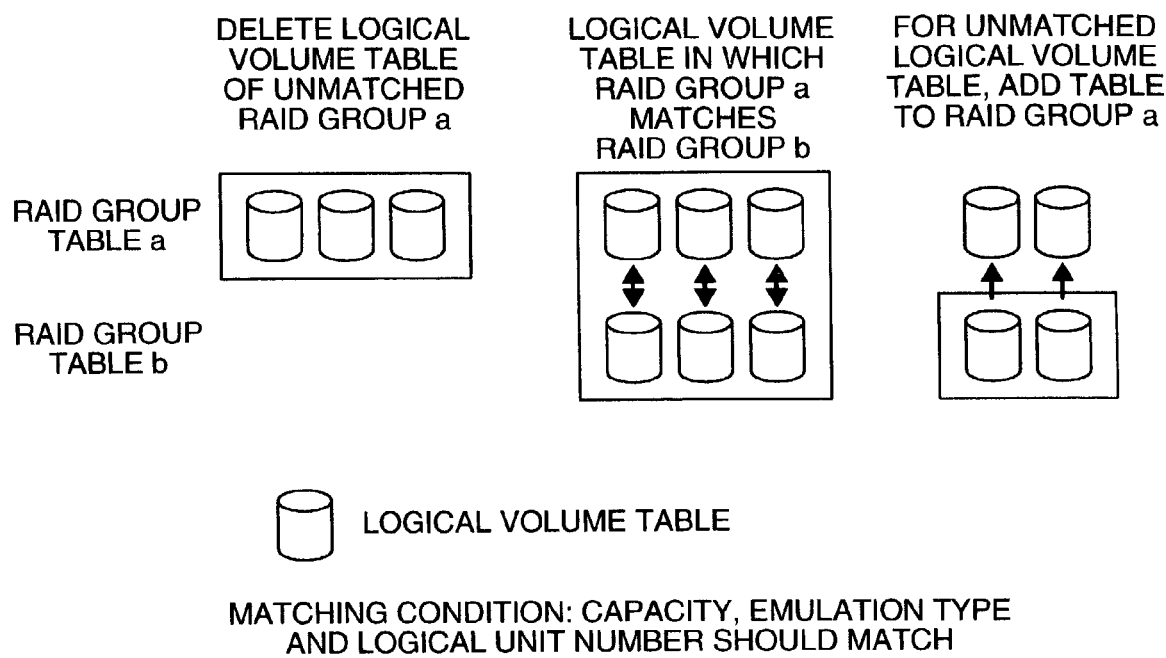
FIG. 19 illustrates processing when the "Create logical volume" check box is ON when logical volume matching fails.

However, when both the "Create logical volume" check box and "Set path, LUN security" check box are ON, logical volumes are created in the RAID group a (208a) through a series of processes from step D100 to step D130, a logical volume is created in the RAID group a (208a) and then a path and LUN security are set. The case where the logical volumes are not matched and the "Create logical volume" check box is ON is shown in FIG. 19. As shown in FIG. 19, the logical volume tables with attributes that only exist in the RAID group table a (503a) are deleted and the logical volume tables with attributes that only exist in the RAID group table b (503b) are added to the RAID group table a (503a). Thus, the logical volumes of the same attribute as the RAID group b (208b) are created in the RAID group a (208a) and a path and LUN security are set in each logical volume.

By the way, the aforementioned explanations use an example of a case where the setting of the RAID group in the disk subsystem A (201a) is performed based on the setting content of the RAID group in the disk subsystem B (201b), but it is also possible to use the setting content of the RAID group in the disk subsystem A (201a) as the basis.

Furthermore, the aforementioned example shows one RAID group to be set and one RAID group to be used as the basis, but it is also possible to provide a mode in which a plurality of RAID groups is selected and set at a time.

This makes it easier to make settings for disk subsystems.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk subsystem setting method of setting a first disk subsystem, for which setting information regarding path, logical unit number (LUN) security and logical volume for each volume in disk configuration is undefined using an information processing apparatus connected to the first disk subsystem and a second disk subsystem, for which setting information regarding path, LUN and logical volume for each volume is defined, comprising the steps of:

receiving through an input apparatus of said information processing apparatus a first input to read said undefined setting information of said first disk subsystem from a first memory of said first disk subsystem by use of a file name;

acquiring first attribute information including a number of ports, a port display name, and a disk capacity for a Redundant Array of Inexpensive Disks (RAID) previously stored in said first disk subsystem and said undefined setting information from said first disk subsystem by use of the file name;

acquiring, in response to a second input through said input apparatus, second attribute information including a number of ports, a port display name, and a disk capacity for RAID previously stored in said second disk subsystem and said defined setting information including a path table, a LUN security table, and a logical volume table, from a second memory of said second disk subsystem by use of the file name;

checking whether the number of ports of said first disk subsystem is equal to or greater than the number of ports of said second disk subsystem;

checking whether all port display names in said first disk subsystem are included in the port display names of said second disk subsystem;

checking whether the disk capacity for a RAID in said first disk subsystem is equal to or greater than the disk capacity for a RAID in said second disk subsystem;

wherein if a result of any of the steps of checking the number of ports, checking the port display names, or checking the disk capacity is negative, then a command is not sent to change a setting of said first disk subsystem, otherwise proceeding to the steps of:

checking whether no logical volume is set in said first disk subsystem, wherein if a result of the step of checking for no logical volume is negative, then a command is not sent to change the setting of said first disk subsystem, otherwise proceeding to a step of creating a logical volume in said first disk subsystem, when a create box has been set through said input apparatus;

changing said undefined setting information based on said defined setting information by creating a same number of logical volume tables for logical volumes in said first disk subsystem as a number of logical volume tables for logical volumes in said second disk subsystem to extract difference information of said defined setting information of said path, LUN security, and logical volume tables and said undefined setting information of said path, LUN security and logical volume tables;

creating a setting command to create a path, a LUN security, or a logical volume in said first disk subsystem based on said difference information; and sending said setting command to said first disk subsystem.

2. The disk subsystem setting method according to claim 1, further comprising a step of checking adaptability of said undefined setting information to said defined setting information prior to the step of changing said undefined setting information.

3. A program executed by an information processing apparatus to set a first disk subsystem, for which setting information on at least the disk configuration is undefined using the information processing apparatus connected to said first disk subsystem, said program allowing said information processing apparatus to execute the steps of:

acquiring said undefined setting information from said first disk subsystem;

changing said undefined setting information based on defined setting information of a second subsystem by creating a same number of logical volume tables for logical volumes in the first disk subsystem as a number of logical volume tables for logical volumes in the second disk subsystem to extract difference information of the defined setting information of the path, logical unit number (LUN) security and logical volume tables;

creating a setting command to create a path, a LUN security, or a logical volume in the first disk subsystem based on the difference information; and sending said setting command to said first disk subsystem.

4. A program executed by an information processing apparatus to set a first disk subsystem, for which setting information regarding path, logical unit number (LUN) security and logical volume in disk configuration is undefined, using said information processing apparatus connected to the first disk subsystem and a second disk subsystem, for which setting information regarding path, LUN security and logical volume is defined, comprising the steps of:

receiving through an input apparatus of said information processing apparatus a first input to read said undefined setting information of said first disk subsystem from a first memory of said first disk subsystem by use of a file name;

acquiring first attribute information including a number of ports, a port display name, and a disk capacity for a Redundant Array of Inexpensive Disks (RAID) previously stored in said first disk subsystem and said undefined setting information from said first disk subsystem by use of the file name;

acquiring, in response to a second input through said input apparatus, second attribute information including a number of ports, a port display name, and a disk capacity for a RAID previously stored in said second disk subsystem and said defined setting information including a path table, a LUN security table, and a logical volume table, from a second memory of said second disk subsystem by use of the file name;

checking whether the number of ports of said first disk subsystem is equal to or greater than the number of ports of said second disk subsystem;

checking whether all port display names in said first disk subsystem are included in the port display names of said second disk subsystem;

checking whether the disk capacity for a RAID in said first disk subsystem is equal to or greater than the disk capacity for a RAID in said second disk subsystem;

wherein if a result of any of the steps of checking the number of ports, checking the port display names, or checking the disk capacity is negative, then a command is not sent to change a setting of said first disk subsystem, otherwise proceeding to the steps of:

checking whether no logical volume is set in said first disk subsystem, wherein if a result of the step of checking for no logical volume is negative, then a command is not sent to change the setting of said first disk subsystem, otherwise proceeding to a step of creating a logical volume in said first disk subsystem, when a create box has been set through said input apparatus;

changing said undefined setting information based on said defined setting information by creating a same number of logical volume tables for logical volumes in said first disk subsystem as a number of logical volume tables for logical volumes in said second disk subsystem to extract difference information of said defined setting information of said path, LUN security, and logical volume tables and said undefined setting information of said path, LUN security, and logical volume tables;

creating a setting command to create a path, a LUN security, or a logical volume in said first disk subsystem based on said difference information; and sending said setting command to said first disk subsystem.

5. The program according to claim 4, further comprising a step of checking adaptability of said undefined setting information to said defined setting information prior to the step of changing said undefined setting information.

6. An information processing apparatus connected to and used for setting a first disk subsystem, for which setting information on at least the disk configuration is undefined, comprising:

means for acquiring said undefined setting information from said first disk subsystem;

means for changing said undefined setting information based on defined setting information of a second subsystem by creating a same number of logical volume tables for logical volumes in the first disk subsystem as a number of logical volume tables for logical volumes in the second disk subsystem to extract difference information of the defined setting information of the path, logical unit number (LUN) security and logical volume tables;

means for creating a setting command based to create a path, a LUN security, or a logical volume in the first disk subsystem based on the difference information; and means for sending said setting command to said first disk subsystem.

7. An information processing apparatus for setting a first disk subsystem, for which setting information regarding path, logical unit number (LUN) security and logical volume for each volume in disk configuration is undefined, when said information processing apparatus is connected to the first disk subsystem and a second disk subsystem, for which setting information regarding path, LUN security and logical volume for each volume is defined, comprising:

means for receiving through an input apparatus of said information processing apparatus a first input to read said undefined setting information of said first disk subsystem from a first memory of said first disk subsystem by use of a file name;

means for acquiring first attribute information including a number of ports, a port display name, and a disk capacity for a Redundant Array of Inexpensive Disks (RAID) previously stored in said first disk subsystem and said undefined setting information from said first disk subsystem by use of the file name;

means for acquiring, in response to a second input through said input apparatus, second attribute information including a number of ports, a port display name, and a disk capacity for a RAID previously stored in said second disk subsystem and said defined setting information including a path table, a LUN security table, and a logical volume table, from a second memory of said second disk subsystem by use of the file name;

means for checking whether the number of ports of said first disk subsystem is equal to or greater than the number of ports of said second disk subsystem;

means for checking whether all port display names in said first disk subsystem are included in the port display names of said second disk subsystem;

means for checking whether the disk capacity for a RAID in said first disk subsystem is equal to or greater than the disk capacity for a RAID in said second disk subsystem;

wherein if a result of any of the checking the number of ports, checking the port display names, or checking the disk capacity is negative, then a command is not sent to change a setting of said first disk subsystem;

means, otherwise, for checking whether no logical volume is set in said first disk subsystem, wherein if a result of checking for no logical volume is negative, then a command is not sent to change the setting of said first disk subsystem; and means for creating, if the checking proved to be true, a logical volume in said first disk subsystem, when a create box has been set through said input apparatus;

wherein said creating means further comprises:

means for changing said undefined setting information based on said defined setting information by creating a same number of logical volume tables for logical volumes in said first disk subsystem as a number of logical volume tables for logical volumes in said second disk subsystem to extract difference information of said defined setting information of said path, LUN security, and logical volume tables and said undefined setting information of said path, LUN security, and logical volume means for creating a setting command to create a path, a LUN security, or a logical volume in said first disk subsystem based on said difference information; and means for sending said setting command to said first disk subsystem.

8. The information processing apparatus according to claim 7, wherein the means for changing said undefined setting information includes means for checking adaptability of said undefined setting information to said defined setting information.

9. A disk subsystem that receives a setting command on at least the disk configuration and performs the self-settings according to said command using the information processing apparatus according to claim 8.

* * * * *

UNITED STATES PATENT AND TRADEMARK OFFICE
CERTIFICATE OF CORRECTION

| | | |
|---|---|---|
| PATENT NO. | : 7,117,141 B2 | Page 1 of 1 |
| APPLICATION NO. | : 10/230430 | |
| DATED | : October 3, 2006 | |
| INVENTOR(S) | : Kaji et al. | |

It is certified that error appears in the above-identified patent and that said Letters Patent is hereby corrected as shown below:

Title page, under (Notice):
Please delete "This patent is subject to a terminal disclaimer."

Signed and Sealed this

Twentieth Day of March, 2007

JON W. DUDAS
*Director of the United States Patent and Trademark Office*